US009988703B2

(12) United States Patent
Cook et al.

(10) Patent No.: US 9,988,703 B2
(45) Date of Patent: Jun. 5, 2018

(54) SYSTEM, APPARATUS, AND METHOD FOR MONITORED THERMAL SPRAYING

(71) Applicant: Flame-Spray Industries, Port Washington, NY (US)

(72) Inventors: David J. Cook, Naperville, IL (US); Keith A. Kowalsky, Oyster Bay, NY (US); Chris Berghorn, East Moriches, NY (US); John Conti, Williston Park, NY (US); Scott R. Harrigan, Oyster Bay, NY (US); David Barton, Northport, NY (US)

( * ) Notice: Subject to any disclaimer, the term of this patent is extended or adjusted under 35 U.S.C. 154(b) by 0 days. days.

(21) Appl. No.: 15/191,497

(22) Filed: Jun. 23, 2016

(65) Prior Publication Data

US 2017/0369980 A1 Dec. 28, 2017

(51) Int. Cl.
*B23K 10/00* (2006.01)
*C23C 4/134* (2016.01)
*B05B 12/08* (2006.01)
*B05B 7/22* (2006.01)

(52) U.S. Cl.
CPC .............. *C23C 4/134* (2016.01); *B05B 7/224* (2013.01); *B05B 12/08* (2013.01)

(58) Field of Classification Search
CPC ......... C23C 4/134; B05B 7/224; B05B 12/08; H05H 1/36; H05H 1/42
USPC ...... 219/121.47, 76.16, 76.15, 137 R, 137.2, 219/130.31, 130.32, 130.33, 121.54, 219/124.34
See application file for complete search history.

(56) References Cited

U.S. PATENT DOCUMENTS 4,122,327 A * 10/1978 Vogts .................. B23K 10/006 219/121.36
5,528,010 A * 6/1996 Herwig ................ B23K 9/1333 219/121.47
6,134,005 A * 10/2000 Smith, Jr. ................. G01J 3/28 356/369
6,680,456 B2 * 1/2004 Adams ................. B23K 10/027 219/121.47
6,703,579 B1 * 3/2004 Rice ..................... B23K 10/006 219/121.47
8,013,994 B1 * 9/2011 Vattiat ................... G01J 5/0014 219/121.36
8,581,138 B2 * 11/2013 Kowalsky ............... B05B 7/224 219/121.47

* cited by examiner

*Primary Examiner* — Mark Paschall

(57) ABSTRACT

A system (100), apparatus (110), and method (900) for monitored thermal spraying. One or more sensors (610) are used to capture one or more types of measurements (650) to monitor the thermal spraying process. A processor (710) can analyze a waveform (750) of measurements (650), such as electrical measurements (652). The processor (710) can then initiate a response (770) such as a warning (772) or an automatic adjustment (790) that is triggered by an identified operating condition (800).

20 Claims, 28 Drawing Sheets

| **Operating Condition (800)** | **Typical Detection By Waveform (750) Attribute** |
| --- | --- |
| Wire Curvature (801) | Peak-to-Peak (751) |
| Wire Curvature Rate of Change (802) | ΔPeak-to-Peak/Δt (752) |
| Torch RPM (803) | Period (753) |
| Torch RPM Rate of Change (804) | ΔPeriod/Δt (754) |
| Wire Feed Motion (805) | Peak-to-Peak (751)<br>ΔPeak-to-Peak /Δt (752)<br>Average Value (758)<br>ΔAverage Value/Δt (759) |
| Poor Electrical Contact (806) | Non-Periodic Discontinuity (757) |
| Rotationally-Dependent Poor Electrical Contact (807) | Periodic Discontinuity (756) |
| Plasma Distortion (808) | Peak-to-Peak (751)<br>Average Value (758) |
| Plasma Distortion Rate-of-Change (809) | ΔPeak-to-Peak/Δt (752)<br>ΔAverage Value/Δt (759) |

Figure 2g

SYSTEM, APPARATUS, AND METHOD FOR MONITORED THERMAL SPRAYING

BACKGROUND OF THE INVENTION

The invention relates generally to the spraying of a substance onto a surface. More specifically, the invention is a plasma transferred wire arc system, apparatus, and method for monitored thermal spraying (collectively, the "system").

A. Plasma

There are four "states of matter" in physics. Matter can take the form of: (1) a solid; (2) a liquid; (3) a gas; or (4) a plasma. Plasma is an ionized gas consisting of positive ions and free electrons in equal proportions resulting in essentially no overall electric charge. Like a gas, plasma does not have a definitive shape or volume. It will expand to fill the space available to it. Unlike gases, plasmas are electrically conductive. Plasma conducts electricity, produces magnetic fields, and responds to electromagnetic forces. In plasma, positively charged nuclei travel in a space filled of freely moving disassociated electrons. These freely moving electrons allow matter in a plasma state to conduct electricity.

Although the term "plasma" is not commonly used outside the context of science and engineering, there are many common examples of plasma that people encounter in everyday life. Lightning, electric sparks, fluorescent lights, neon lights, and plasma televisions are all examples of plasma. Gas is typically converted into a state of plasma through heat (e.g. high temperatures) or electricity (e.g. a high voltage difference between two points).

B. Thermal Spraying

Thermal spraying is a process by which material is sprayed onto a surface with the purpose of improving the surface that is being sprayed. There are many different types of thermal spraying, including, but not limited to: plasma spraying; detonation spraying; wire arc spraying; plasma transferred wire arc spraying; flame spraying; high velocity oxy-fuel coating spraying ("HVOF"); warm spraying; and cold spraying.

Two of these thermal spraying techniques involve the use of plasma, plasma spraying and plasma transferred wire arc spraying. Plasma spraying involves the introduction of feedstock, which can be in the form of a powder, a liquid, a ceramic feedstock that is dispersed in a liquid suspension, or a wire that is introduced into a plasma jet created by a plasma torch. Plasma transferred wire arc ("PTWA") spraying is plasma spraying when the feedstock is electrically part of the circuit and is in the form of a wire.

C. PTWA

PTWA can be used to enhance the surface properties of components. Treated components can be protected against extreme heat, abrasion, corrosion, erosion, abrasive wear, and other environmental and operational conditions that would otherwise limit the lifespan and effectiveness of the treated component. Overall durability is enhanced, while at the same time PTWA can also be used to achieve the following advantages with respect to treated components: (1) reductions in weight; (2) cost savings; (3) reduction in friction; (4) and a reduction of stress. In the context of vehicles such as automobiles, PTWA treatment of engine components such as cylinder bores can result in increased fuel economy and lower emissions. PTWA can also be useful in refurbishing old parts as well as in enhancing new parts.

The inputs of a PTWA system are electricity, gas, and consumable feedstock. The output of a PTWA system is a plasma arc between a cathode and an anode, where the anode is an open end of a consumable wire. The plasma spray is what enhances the surface properties of a component or surface being treated. Feedstock in a PTWA system is delivered to the plasma torch in the form of the wire. Electric current travels through the wire as the free end of the wire is moved to where the generated plasma exits the nozzle of the plasma torch. In many PTWA systems, the torch assembly revolves around a longitudinal axis of the wire feedstock while maintaining an electrical connection, a plasma arc, between the cathode of the plasma torch and the open end of the wire feedstock. In some embodiments, there is an offset between the longitudinal axis of the wire feedstock and the center of revolution (from the perspective of a cathode revolving around a center point) or the center of rotation (from the perspective of a cathode and surrounding empty space rotating around a center point). See U.S. Pat. No. 8,581,138 which discloses a thermal spray technology "wherein the method includes the steps of offsetting the central axis of a consumable wire with respect to an axial centerline of a constricting orifice."

PTWA can provide highly desirable benefits in the treatment of components used in a wide variety of different industries, including but not limited to: aerospace; automotive; commercial vehicles; heavy industrial equipment; and rail.

D. Operating Parameters

The correct functioning of a PTWA system typically requires the coordination of: (1) a straight and rapidly traveling feed wire between about 100-500 inches/minute; (2) stable current traveling through the rapidly traveling feed wire; and (3) a consistent gas flow/pressure sufficient for sustaining stable plasma temperatures typically between 6,000 and 20,000 degrees Celsius. If one or more of the parameters of a PTWA system fall outside the desired ranges, inconsistent melting of the feed wire can result. Such inconsistency can negate the desired advantages of PTWA spraying. In extreme cases, such inconsistencies can result in a waste of the feedstock and the component being sprayed.

The correct functioning of a PTWA system requires the coordination of different variables under substantially tight constraints. Operations outside those constraints are not necessarily visible to the human eye unless the undesirable effects are severe. For example, a PTWA system functioning outside of desired parameters can result in "spitting" because the system will project large molten globules instead of finely atomized particles onto the surface being treated by the PTWA system. Even before visible "spitting" occurs, the operation of a PTWA system with even one parameter outside of an acceptable range can be highly undesirable.

E. Monitoring Patterns in the Data

Prior art PTWA systems may monitor certain parameters such as voltage measurements in the electrical pathway that are used to sustain a plasma arc. However, prior art PTWA systems do not analyze data for patterns in the data collected over time, i.e. process the data captured over time as waveforms. The failure to process a series of data as a waveform means that such systems can experience undesirable performance degradations that are not noticed by human operators until after the fact.

The prior art misses some valuable opportunities to proactively identify undesirable operating conditions before such conditions result in undesirable outcomes because the prior art fails to look for patterns in the sensor data. Prior art approaches do not process at least some of the sensor data as a waveform.

The system can be further understood as described in the Summary of the Invention section set forth below.

SUMMARY OF THE INVENTION

The invention relates generally to the spraying of a substance onto a surface. More specifically, the invention is a plasma transferred wire arc system, apparatus, and method for monitored thermal spraying (collectively, the "system").

The system can utilize one or more of a variety of different sensors. Such sensors can capture one or more of a wide variety of different sensor measurements. The system can process some or all of such data as being part of a pattern or waveform.

Electrical measurements captured along the electrical pathway that supports the plasma arc can be particularly useful in the proactive monitoring of the system. The inclusion of other additional types of data can expand the types of conditions that can be proactively monitored.

Different embodiments of the system can be configured to provide different types of responses to different types of conditions identified through different types of sensor data. Responses can include: (1) one or more warnings; and/or (2) one or more automatic adjustments to the operation of the system. The monitoring, archiving, and subsequent analysis of such data opens up future possibilities of even more proactive error detection and/or correction.

The system can be implemented in a wide variety of different ways using a wide variety of different components and configurations. Virtually any PTWA system in the prior art can incorporate and benefit from the monitoring of electrical data as a waveform.

The system can be further understood in terms of the drawings described below.

BRIEF DESCRIPTION OF THE DRAWINGS

Many features and inventive aspects of the system are illustrated in the Figures which are described briefly below. However, no patent application can disclose through text descriptions or graphical illustrations all of the potential embodiments of an invention. In accordance with the provisions of the patent statutes, the principles and modes of operation of the system are explained and illustrated with respect to certain preferred embodiments. However, it must be understood that the components, configurations, and methods described above and below may be practiced otherwise than is specifically explained and illustrated without departing from its spirit or scope. Each of the various elements described in the glossary set forth in Table 1 below can be implemented in a variety of different ways while still being part of the spirit and scope of the invention.

As illustrated in FIG. 1*b*, the cathode (along with the rest of the torch assembly which is not displayed in the figure) rotates around the center which in this diagram is marked by the position of the wire.

FIG. 2*g* is a chart diagram illustrating a potentially undesirable operating condition and the corresponding waveform attribute(s) that can potentially be used to identify the particular operating condition.

As illustrated in FIG. 1*e*, such variances in the "gap" distance will typically result in voltage or other electrical measurement variances.

As illustrated in FIG. 1*e*, such variances in "gap" distance will typically result in voltage or other electrical measurement variances.

Figure 1A:
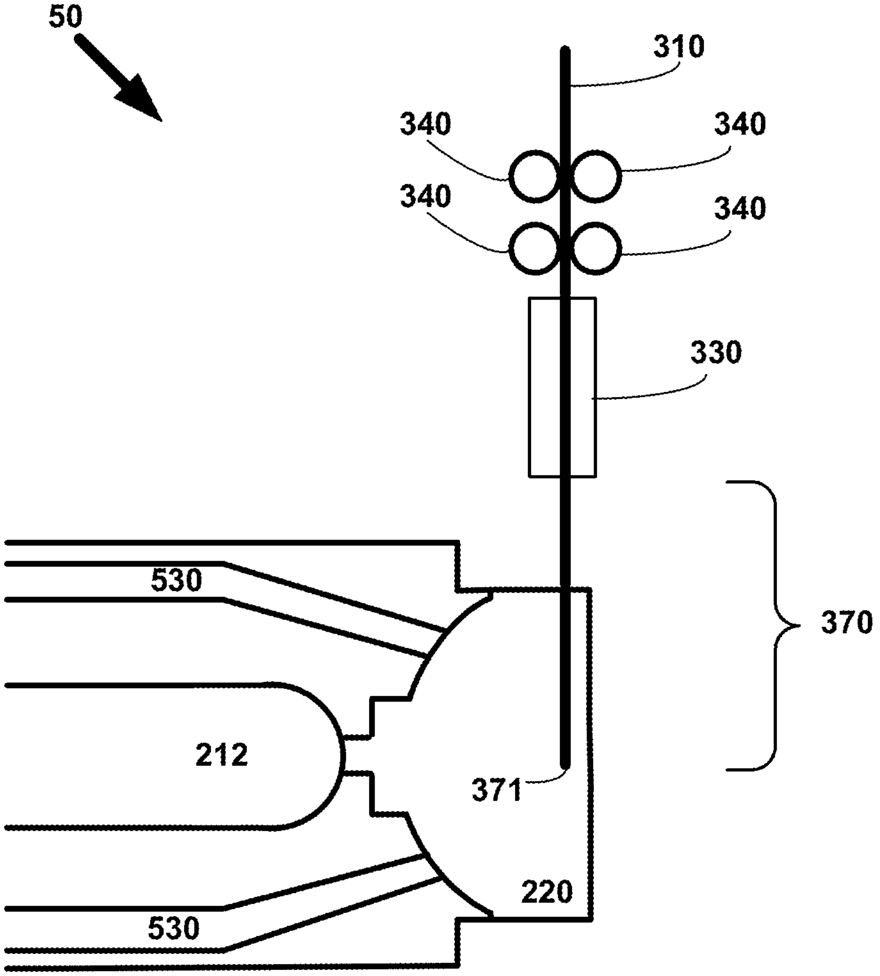
Prior Art Figure 1a
FIG. 1*a* is an abbreviated cross-section diagram illustrating an example of certain components in a prior art PTWA system. The illustration shows a free end of a wire in a position for the creation of a plasma arc between the cathode and the free end of the wire.

The drawings described briefly above can be further understood in accordance with the Detailed Description section set forth below.

DETAILED DESCRIPTION

The invention relates generally to the spraying of a substance onto a surface. More specifically, the invention is a plasma transferred wire arc ("PTWA") system, apparatus, and method for monitored thermal spraying (collectively, the "system" 100).

All component numbers referenced in the text below are listed in Table 1 along with an element name and definition.

I. Overview

The system 100 can be implemented and used with respect to virtually any prior art PTWA apparatus 50. The addition of a sensor 610 and a processor 710 can transform a prior art PTWA apparatus 50 into a system 100.

The system 100 uses one or more sensors 610 to capture one or more series of measurements 650 over time that can be processed as one or more waveforms 750. Using at least a subset of one or more waveforms 750, the processor 710 can generate a response 770 such as a warning 772 and/or an automatic adjustment 790.

It is anticipated that at least one of the sensors 610 will be an electrical sensor 611 used to capture electrical measurements 652 such as voltage measurements 654 or current measurements 653. Other types of measurements 650 captured by other types of sensors 610 can be factored into the processing of the processor 710 used to generate responses 770. By way of example, the list of inputs used by the processor 710 to generate a single response 770 as an output can include measurements 650 such as: (1) wire measurements 660 (such as wire position 662 and/or wire speed 664); (2) plasma measurements 670 (such as plasma flow rate 672 and/or plasma pressure 674); and/or (3) electrical measurements (such as voltage measurements 654, current measurements 653, and/or frequency measurements 656). Not all measurements 650 used as inputs to the processor 710 for creating a response 770 must be in the form of a waveform 750. It is anticipated that utilizing electrical measurements 652 as waveforms 750 will be particularly useful to the system 100 in identifying operating conditions 800 that would benefit from the triggering of a response 770 (such as a warning 772 and/or an automatic adjustment 790) in an automated manner without human intervention.

FIG. 2*g* is a chart that discloses different types and combinations of attributes of a waveform 750 created from electrical measurements 652 that can be used to enable a processor 710 to identify an operating condition 800 of the system 100. Other types of additional measurements 650 can be used in addition to the inputs identified in FIG. 2*g*.

Figure 2A:
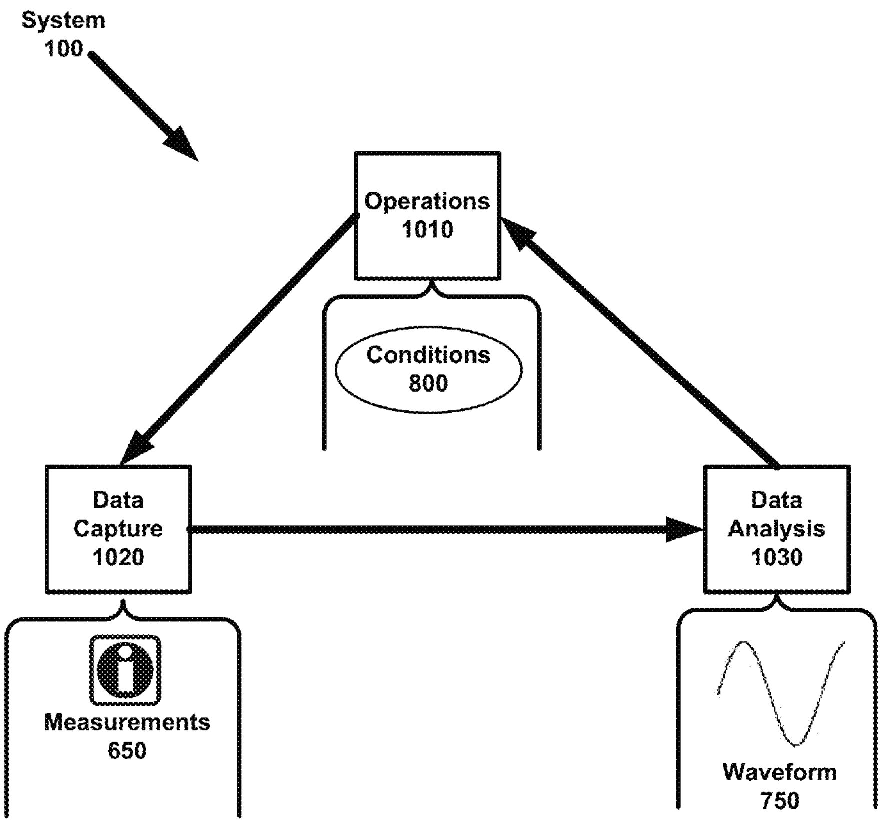
FIG. 2*a* is a block diagram illustrating an example of a view of the system organized into three interacting subsystems.

As illustrated in FIG. 2*a*, the system 100 can be conceptualized as three subsystems that interact with each other. An operations subsystem 1010 that creates and sustains a plasma arc 60, a data capture subsystem 1020 that captures sensor measurements 650 from the conditions 800 of the operations subsystem 1010, and a data analysis subsystem 1030 that processes at least some of the sensor measurements 650 in the form of a waveform 750.

A. Operations

The operations subsystem 1010 is essentially any prior art apparatus 50 used to create and sustain a plasma arc 60. The operations subsystem 1010 can include a variety of different assemblies such as a torch assembly 200, a wire delivery assembly 300, a power delivery assembly 400, and a gas delivery assembly 500. The operating conditions 800 of the operations subsystem 1010 are the attributes being monitored by the system 100. The system 100 monitors the conditions 800 (which can also be referred to as operating parameters) that can impact the creation and sustaining of a plasma arc 60 for the purposes of creating a particle stream 70 directed to the desired surface 80 of a substrate 84.

B. Data Capture

A data capture subsystem 1020 can include one or more sensor assemblies 600. One or more sensors 610 can be used to capture sensor measurements 650 relating to the conditions 800 of the operations subsystem 1010. The function of the data capture subsystem 1020 is to create sensor measurements 650 that can serve as inputs for a data analysis subsystem 1030.

Electrical measurements 652 such as voltage measurements 654 captured along the electrical pathway 492 used to supply the plasma arc 60 with electricity 490, can be particularly useful in monitoring the operating conditions 800 of the operations subsystem 1010. Electrical measurements 652 captured by a high speed electrical sensor 612 can be particularly helpful in the monitoring of operating conditions 800 because the operations subsystem 1010 includes a cathode 212 that rapidly moves in a substantial circular orbit 280 around a rotational centerline 206. It is thus desirable for at least some sensor measurements 650 to be captured in a sufficiently rapid manner so that multiple measurements 650 are captured within a single orbit 280 of the cathode 212.

Figure 2B:
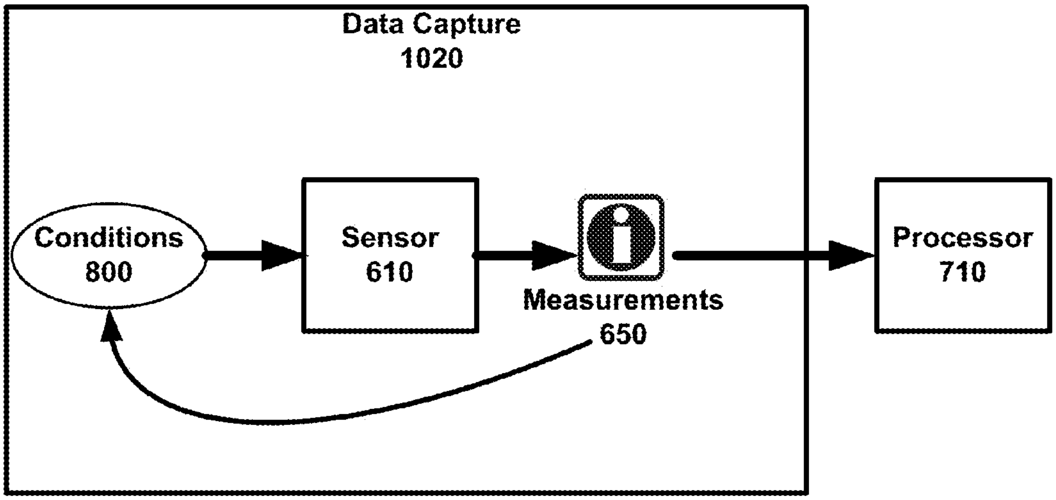
FIG. 2*b* is a block diagram illustrating an example of the functionality that can be performed by a data capture subsystem.

FIG. 2*b* illustrates the processing of a data capture subsystem 1020 that can repeat on a continuous or periodic basis. One or more sensors 610 can rapidly capture repeated measurements 650. Measurements 650 can be captured on a continuous, substantially continuous, or less frequent basis. Such measurements 650 provide data to the data analysis subsystem 1030 that is processed as a waveform 750.

Figure 2C:
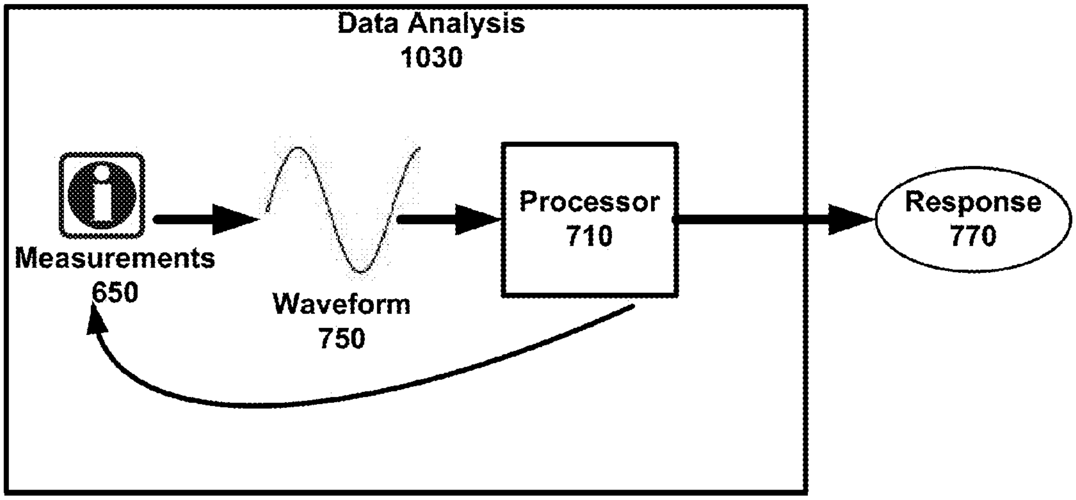
FIG. 2*c* is a block diagram illustrating an example of the functionality that can be performed by a data analysis subsystem.
Figure 2D:
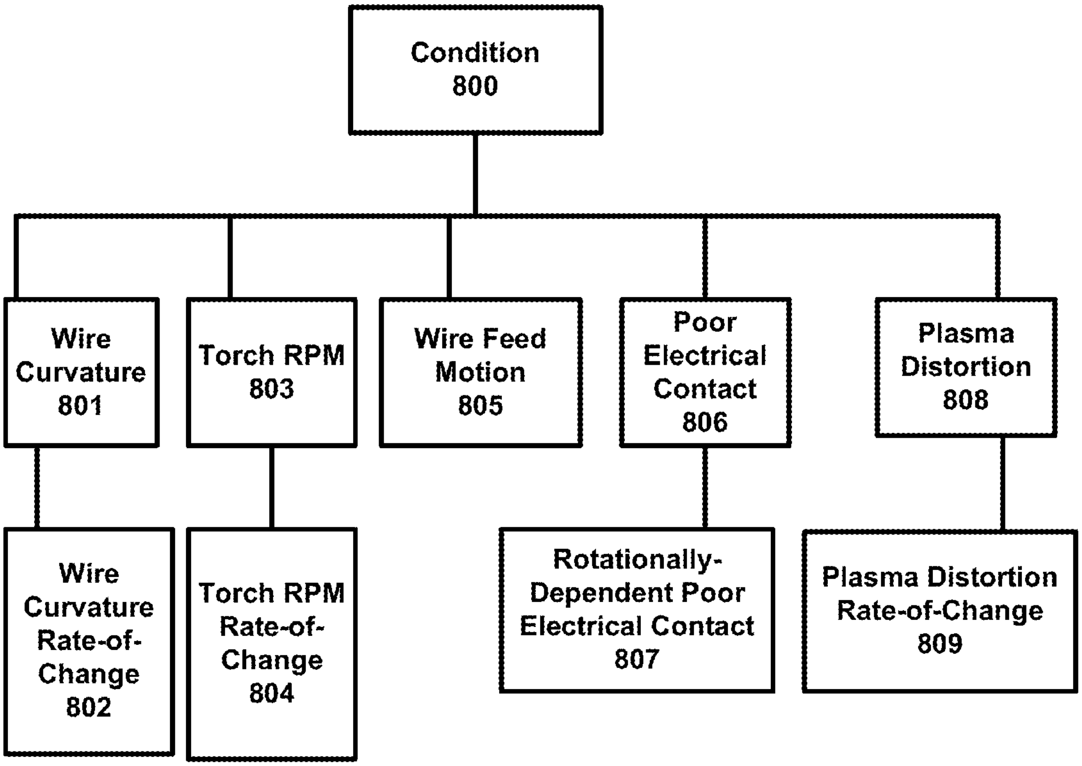
FIG. 2*d* is a hierarchy diagram illustrating different examples of operating conditions that can be identified using a waveform of electrical measurements.
Figure 2E:
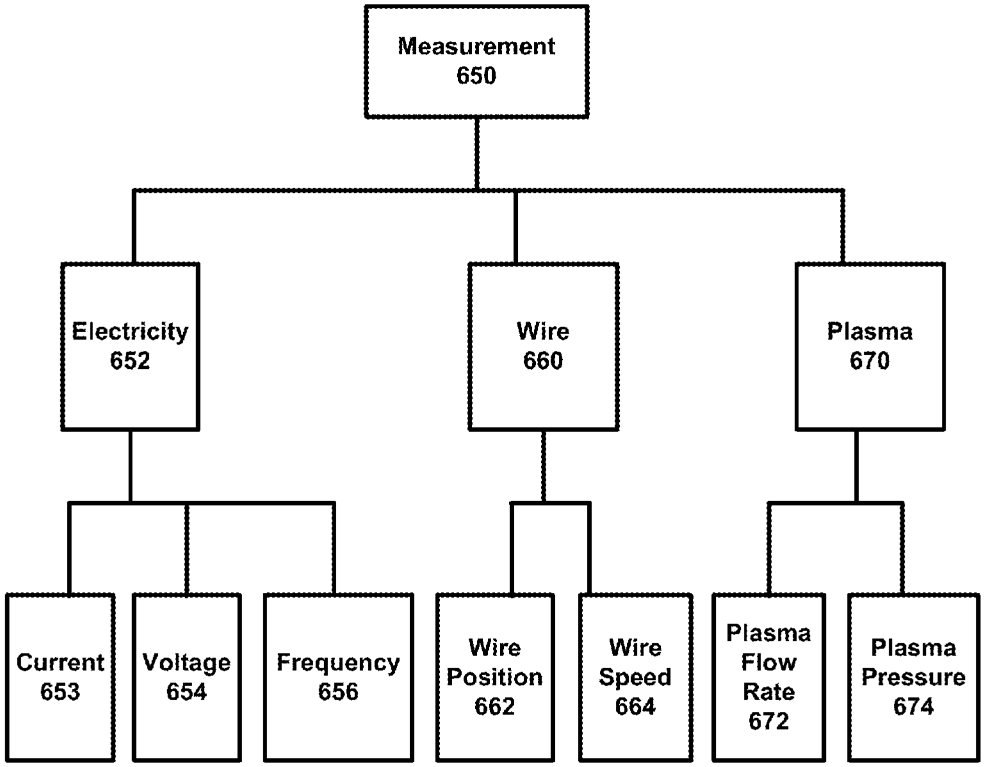
FIG. 2*e* is a hierarchy diagram illustrating an example of different categories and subcategories of measurements that can be utilized by the system.
Figure 2F:
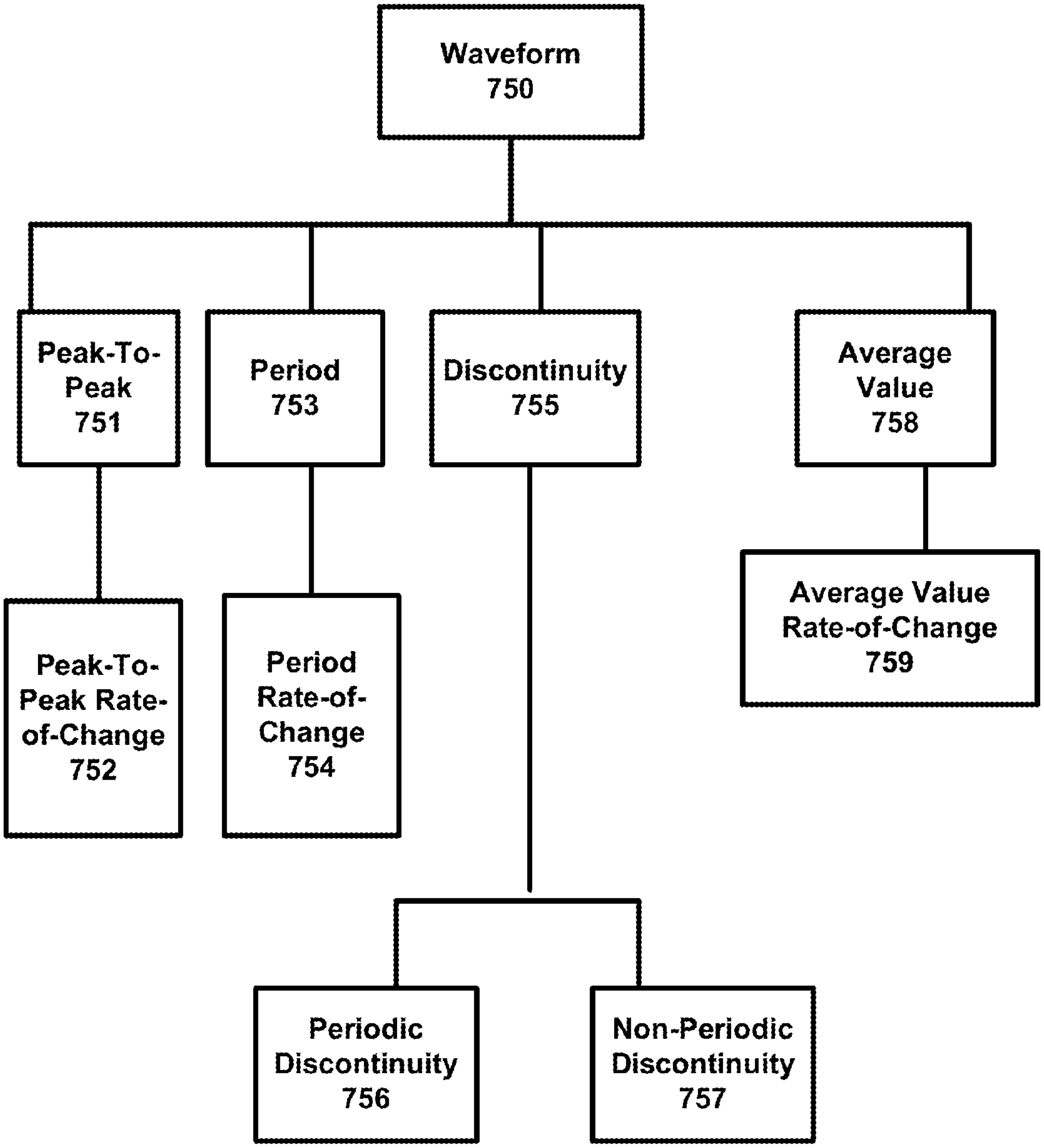
FIG. 2*f* is a hierarchy diagram illustrating an example of different categories and subcategories of waveform attributes that a processor can utilize as inputs to trigger a particular response.

FIG. 2*e* illustrates examples of different categories and subcategories of measurements 650 that can be captured by different sensors 610.

C. Data Analysis

The purpose of the data analysis subsystem 1030 is to selectively create a response 770 when conditions 800 merit the creation of a response 770. The system 100 seeks to proactively monitor the operations subsystem 1010 such that future problems are resolved before they actually generate problematic or even merely undesirable results.

The data analysis subsystem 1030 is comprised of an IT assembly 700 that includes a processor 710. The processor 710 can automatically and selectively generate a response 770 from one or more inputs. Inputs that can trigger a response 770 will typically include a series of electrical measurements 652 in the form of a waveform 750.

The system 100 can detect undesirable conditions 800 through the monitoring of measurements 650. The processing of rapidly obtained electrical measurements 652 over time as a waveform 750 can be particularly desirable in identifying undesirable operating conditions 800. By capturing measurements 650 rapidly over time, the system 100 can detect undesirable conditions 800 and determine which undesirable condition is specifically occurring. The innovative PTWA system 100 can generate a response 770 to a detected undesirable condition 800 without any human intervention.

FIG. 2*c* illustrates an example of a process that can be performed on a continuous or repeated basis by a data analysis subsystem 1030. Measurements 650 in the form of a waveform 750 can be processed by a processor 710 to selectively generate a response 770 when such a response 770 is justified by the underlying processing rules of the system 100.

Inputs to the processor 710 can include one or more waveforms 750 of measurements 650, measurements 650 not the form of a waveform 750, threshold values 740 for comparison purposes, and even historical data 734 stored on a database 732.

D. Waveform

Figure 2H:
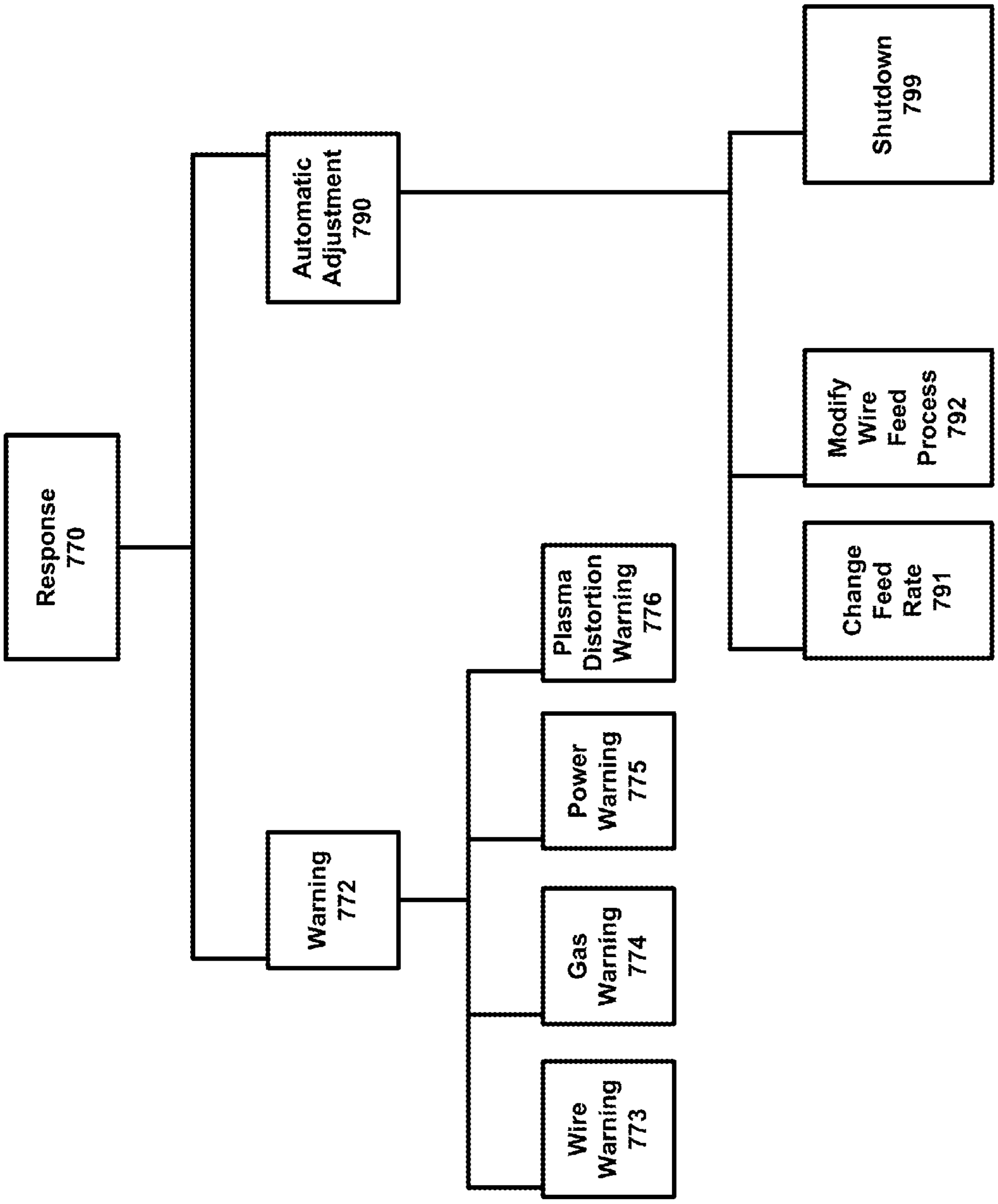
FIG. 2*h* is a hierarchy diagram illustrating an example of different categories and subcategories of responses that can be generated by the system.
Figure 2I:
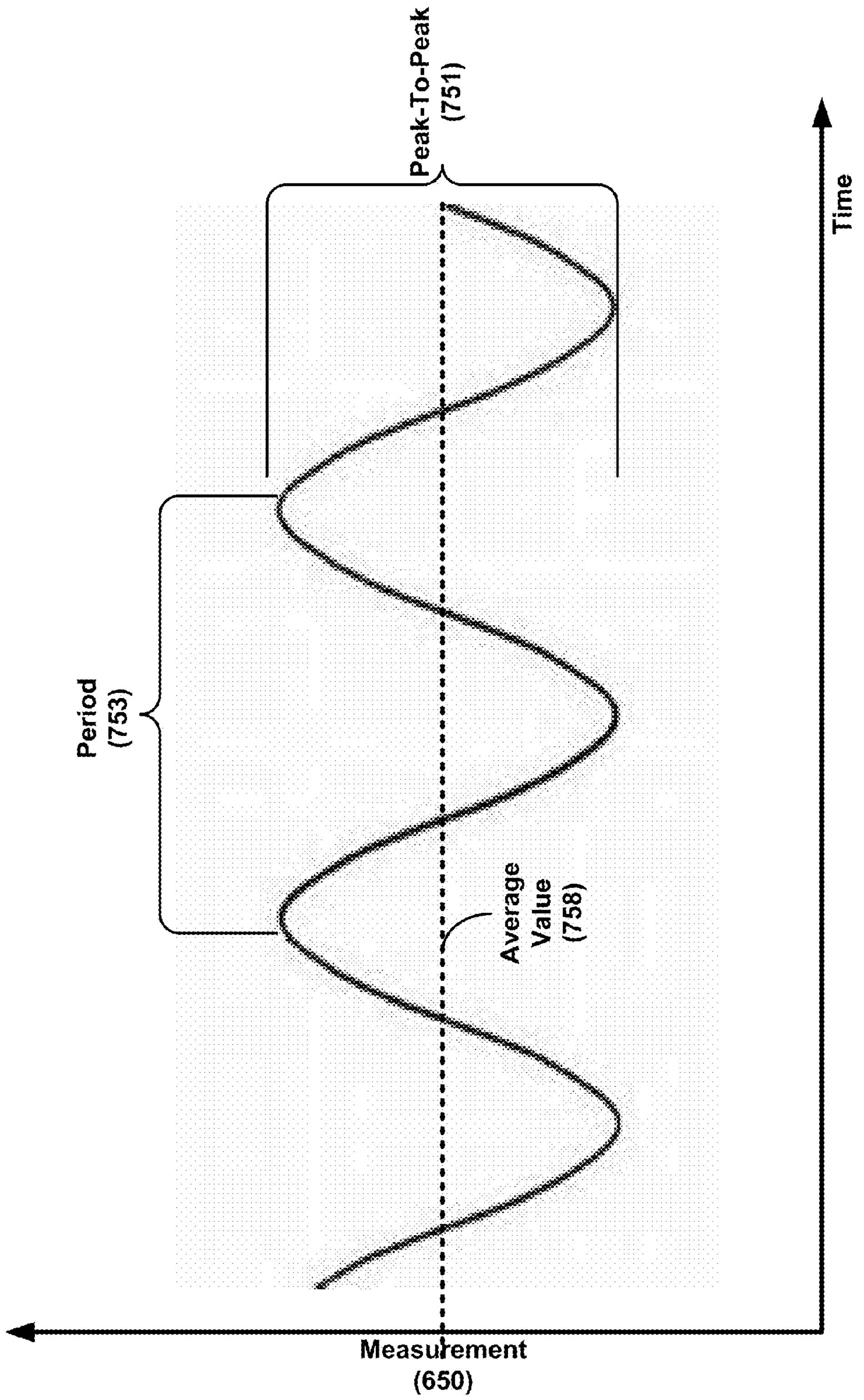
FIG. 2*i* is a waveform diagram illustrating an example of certain waveform attributes.

FIG. 2*i* is a graphical illustration of a waveform 750. The attributes of an average value 758, a period 753, and a peak-to-peak value 751 are illustrated in the Figure. A waveform 750 is a collection of data points collected over time such that relationships between the data points such as patterns can be detected or analyzed. Waveforms 750 possess a wide range of attributes such as absolute amplitude, relative amplitude, maximum points, minimum points, frequency/period, etc. While a waveform 750 can be and often is illustrated in a visual manner, a waveform 750 is the underlying data that is capable of being visually represented in the shape of a wave. Thus a graph of a waveform 750 is a waveform 750, but the same underlying data without a visual representation of the data is also a waveform 750. Measurements 650, such as electrical measurements 652, can be put into the form of a waveform 750 by the sensor 610, the processor 710, or some other component of the system 100. The processor 710 can analyze all or some electrical measurements 652 in the form of a waveform 750, with attributes such as amplitude, frequency, and variations thereof. Examples of attributes associated with a waveform 750 can include, but are not limited to: (a) a peak-to-peak attribute 751; (b) a rate-of-change-in-peak-to-peak attribute 752; (c) a period 753; (d) a rate-of-change-in-period 754; (e) a discontinuity 755 (such as a periodic discontinuity 756 or a non-periodic discontinuity 757); and (f) an average value 758 and a rate-of-change-in-average value 759.

E. Response

The purpose of a monitored system 100 is the selective and automatic generation of a response 770 triggered by the applicable input or combination of inputs. One or more threshold values 740 can be used in the determination by the processor 710 of whether a response 770 is to be triggered. One or more different attributes of a waveform 750 can be used to trigger a response 770 by a processor 710.

FIG. 2*h* is a hierarchy diagram illustrating different categories and subcategories of responses 770 that can be generated by the system 100. A warning 772 is a response 770 that is limited to the communication of a problem to a human operator. An automatic adjustment 790 is a response 770 that includes a change to the operations of the operations subsystem 1010 that is triggered by the system 100 without human intervention. As indicated in FIG. 2*h*, warnings 772 can pertain to specific assemblies relating to the undesirable operating condition 800. Examples of warnings 772 can include but are not limited to: (a) a wire warning 773; (b) a gas warning 774; (c) a power warning 775; and (d) a plasma distortion warning 776. Examples of automatic adjustments 790 can include but are not limited to: (1) a change feed rate 791; (2) a modify wire feed process 792; and (3) a shutdown 799.

F. Operating Conditions

FIG. 2*d* illustrates examples of different categories and subcategories of operating conditions 800 that can be detected through the analysis of electrical measurements 652 captured over time that are processed as a waveform 750. Many embodiments of the system 100 will use a high speed electrical sensor 612 such as a high speed voltage sensor 614 to capture electrical measurements 652 such as voltage measurements 654 in rapid succession over time. Such electrical measurements 652 can be processed as a waveform 750 so that patterns and other relationships between the data points can be used to identify undesirable operating conditions 800 before such conditions 800 manifest themselves in undesirable outcomes.

FIG. 2*g* is chart that associates certain conditions 800 with the aspects of a waveform 750 of electrical measurements 652 that can be used to identify certain undesirable parameters of certain conditions 800.

Electrical measurements 652 are useful variables to track because sustaining a plasma arc 60 for the operation of the system 100 requires that electricity 490 jump across a gap 61 between a cathode 212 and a free end 370 in the wire 310. Electrical measurements 652 can be captured at any location in an electrical pathway 492 that includes the gap 61.

The electrical measurements 652 can reveal certain torch-related undesirable conditions 800 such as: (1) a wire curvature 801 (which causes a cyclical gap 61 between a free end 370 of a wire 310 and a cathode 212 that impacts the electrical measurements 652); (2) a wire curvature rate of change 802; (3) torch RPM 803; (4) torch RPM rate of change 804; (5) wire feed motion 805; (6) poor electrical contact 806; (7) rotationally-dependent poor electrical contact 807; (8) plasma distortion 808; and (9) plasma distortion rate of change 809.

Undesirable operating conditions 800 can be detected before a stream 70 of spit 71 or even non-atomized particles 72 can be otherwise detected by the operators of the apparatus 50. Such conditions 800 go undetected in a prior art apparatus 50 because the prior art apparatus 50 does not capture electrical measurements 652 over time as a waveform 750. The conditions 800 ultimately relate to the electrical pathway 492 that requires connectivity across the gap 61.

In many instances the system 100 can determine more than just the presence of a particular condition 800. The magnitude and the specific attributes or orientation of the condition 800 can be identified in some embodiments of the system 100. This can result in more specific warnings 772 and more opportunities for automated adjustments 790.

1. Wire Curvature (e.g. Bent Wire or Wire Position)

Figure 3A:
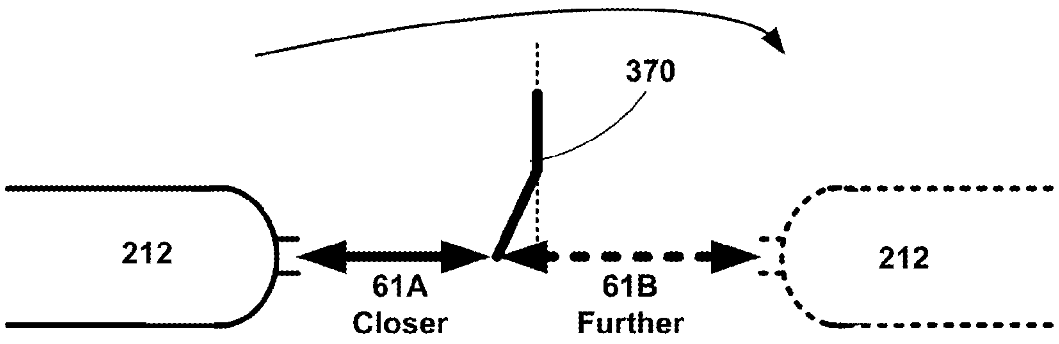
FIG. 3*a* is an abbreviated and exaggerated side view diagram illustrating an example of how a bent wire can result in different "gap" distances between the cathode and the wire as the cathode (along with the rest of the torch assembly which is not displayed in the figure) is rotated around the center (which in FIG. 3*a* is the position of the wire).

FIG. 3*a* illustrates an example of a condition 800 referred to as wire curvature 801. The extent of such curvature is exaggerated in FIG. 3*a* to better illustrate the ramifications of wire curvature 801. Wire curvature 801 can also be referred to as a "bent wire" or "wire position" because such variations each involve a portion of the free end 370 of the wire 310 being consumed by the plasma arc 60 in a position that is at least to some extent undesirable.

FIG. 3*a* illustrates how a bent wire 310 changes the magnitude of the "gap" 61 so that it is either a smaller gap 61A or a larger gap 61B than a desired gap 61. Wire curvature 801 can result in non-atomized particles 72 or even spit 71 being sprayed onto a substrate 84. As illustrated in FIG. 3*a*, the cathode 212 rotates around the free end 370 of the wire 310 while the plasma arc 60 is sustained. Thus the gap 61 in a bent wire condition 801 will often cycle between being larger than desired and shorter than desired within a single revolution of the cathode 212.

Some embodiments of the system 100 can determine the orientation of the bend in the wire 310 in addition to the presence of a bent wire 310. A waveform 750 of electrical measurements can be used to determine the magnitude and direction of the bend in the shape of the wire 310. Such information can be used to describe orientation in terms of magnitude of the bend and in the direction/angle of the bend. Other embodiments of the system 100 may describe the bend in terms of X-Y coordinates.

As disclosed in the incorporate references, the rotational centerline 206 can be the desired position of the wire 310 or the rotational centerline 206 can be offset from the position of the wire 310 so that the wire 310 is not the center around which the cathode 212 rotates.

The wire curvature rate of change condition 802 is the time derivative (rate of change over time) of the wire curvature 801.

2. Wire Feed Motion (e.g. Velocity and Acceleration)

Figure 3B:
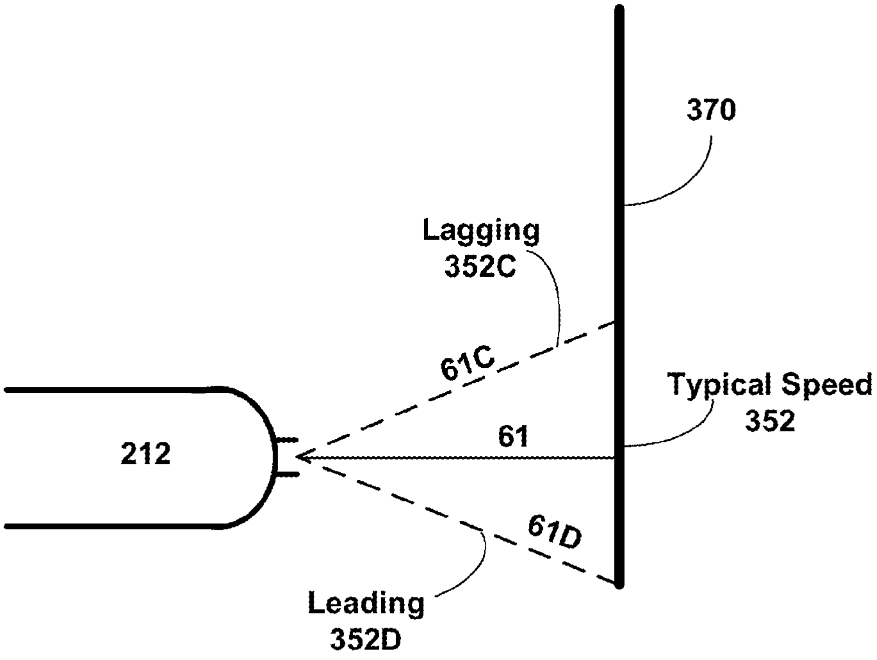
FIG. 3*b* is an abbreviated side view diagram illustrating an example of how variances in the velocity of the wire feed can impact the magnitude of the "gap" between the wire and the cathode.

FIG. 3*b* illustrates how variations and/or discrepancies in the speed and/or acceleration of the wire feed (e.g. wire feed motion 805) can impact the magnitude of the gap 61. At a typical speed 352 (which can also be referred to as an acceptable speed 352) the gap 61 is smaller than the gap 61C that results from a lagging speed 352C or a gap 61D that results from a leading speed 352D. Unlike wire curvature condition 801 which can both increase and decrease the distance of the gap 61, wire feed motion 805 only increases the gap 61. Both the lagging gap 61C and the leading gap 61D are longer than the desired gap 61 that results from wire feed motion 805 within desired parameters.

3. Poor Electrical Contact

Figure 3C:
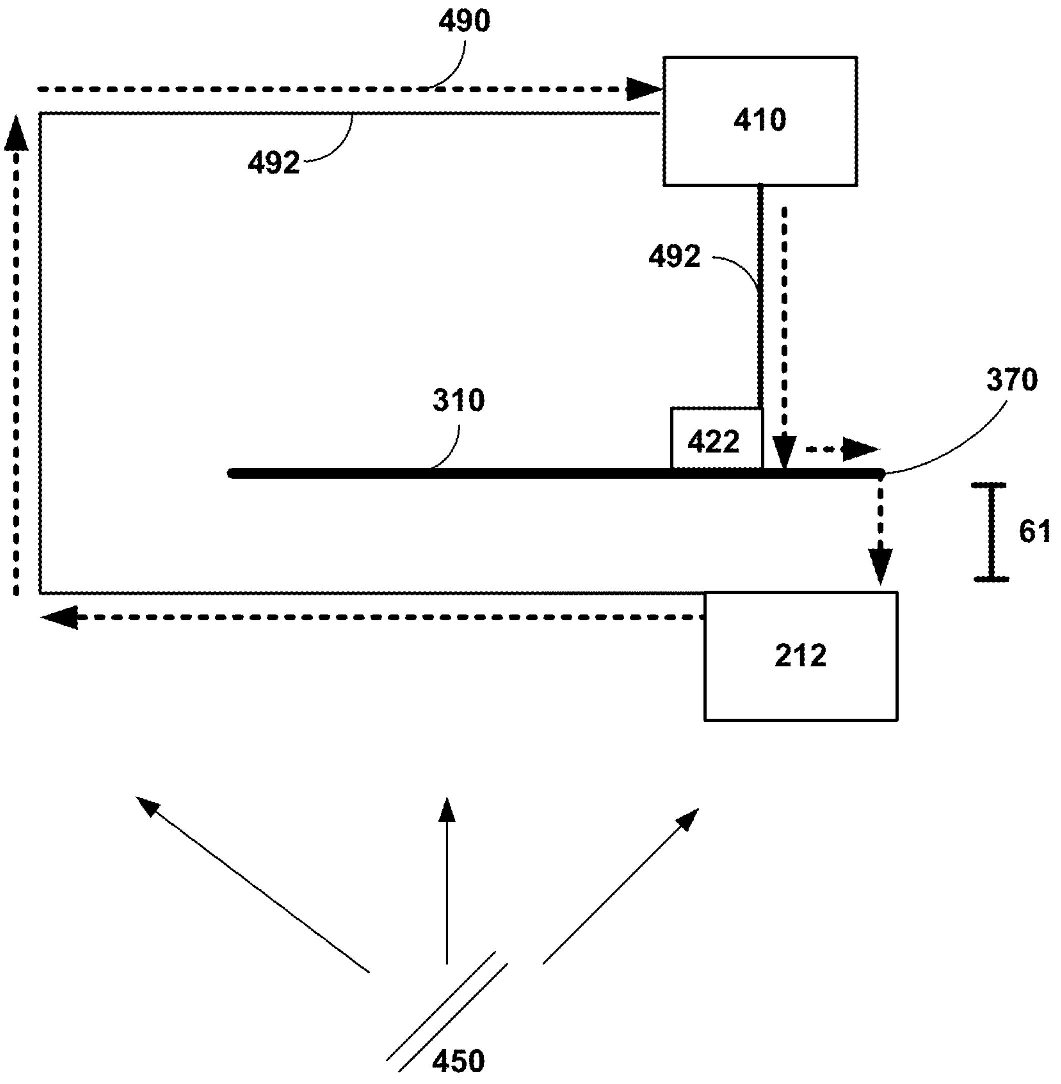
FIG. 3*c* is an abbreviated circuit diagram illustrating an example of how a momentary open circuit at virtually any location in the circuit can impact electrical measurements across the circuit. It is believed that a bad contact tip connecting the wire to the power supply is a likely scenario of such a momentary open circuit condition.

FIG. 3*c* illustrates an example of how an open circuit 450 anywhere in the electrical pathway 492 of the prior art apparatus 50 can impact the ability of the prior art apparatus 50 to sustain the plasma arc 60 across the gap 61. A poor electrical contact 806 can exist at virtually any spot along the PTWA circuit 492, but a bad contact 450 at the contact tip 422 (typically made of a copper alloy) is a particularly likely cause of the problem. The intermittent loss of connectivity can be distinguished from other undesired conditions 800 through a pattern of electrical measurements 652.

Some instances of poor electrical contact 806 are rotationally dependent because they relate to the rotation of the cathode 212 around a rotational centerline 206. Such instances can be referred to as rotationally-dependent poor electrical contact 807.

4. Plasma Distortion

Figure 3D:
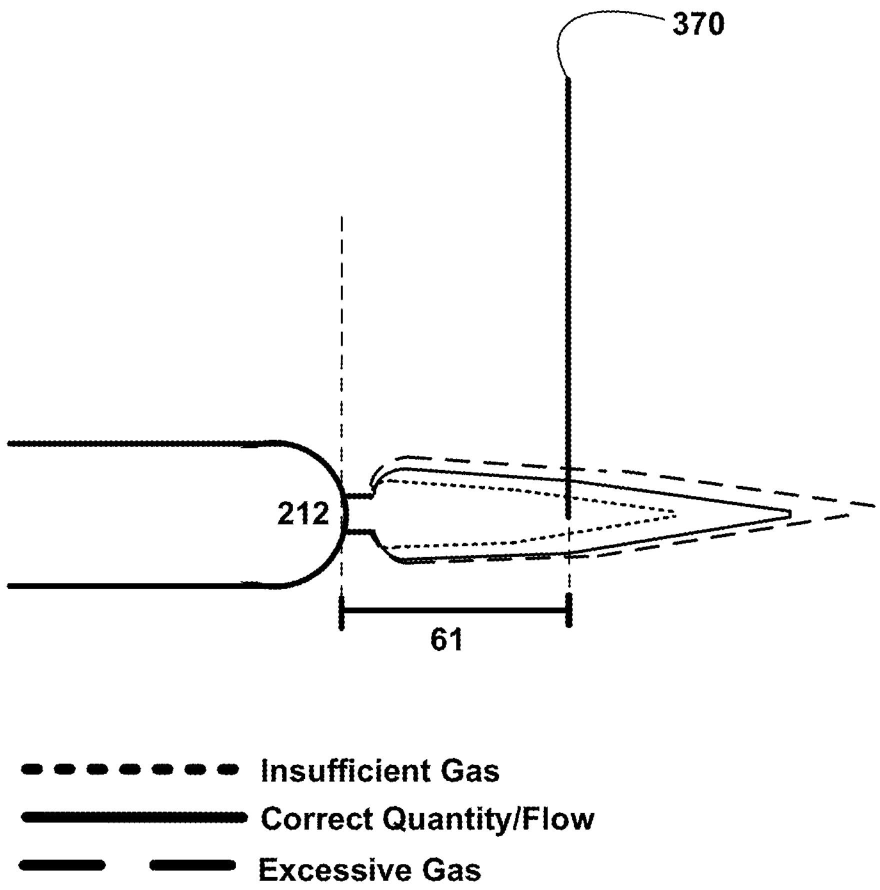
FIG. 3*d* is a diagram illustrating an example of how variances in gas flow and direction can result in variances in a particle stream as well as the plasma arc.
Figure 3E:
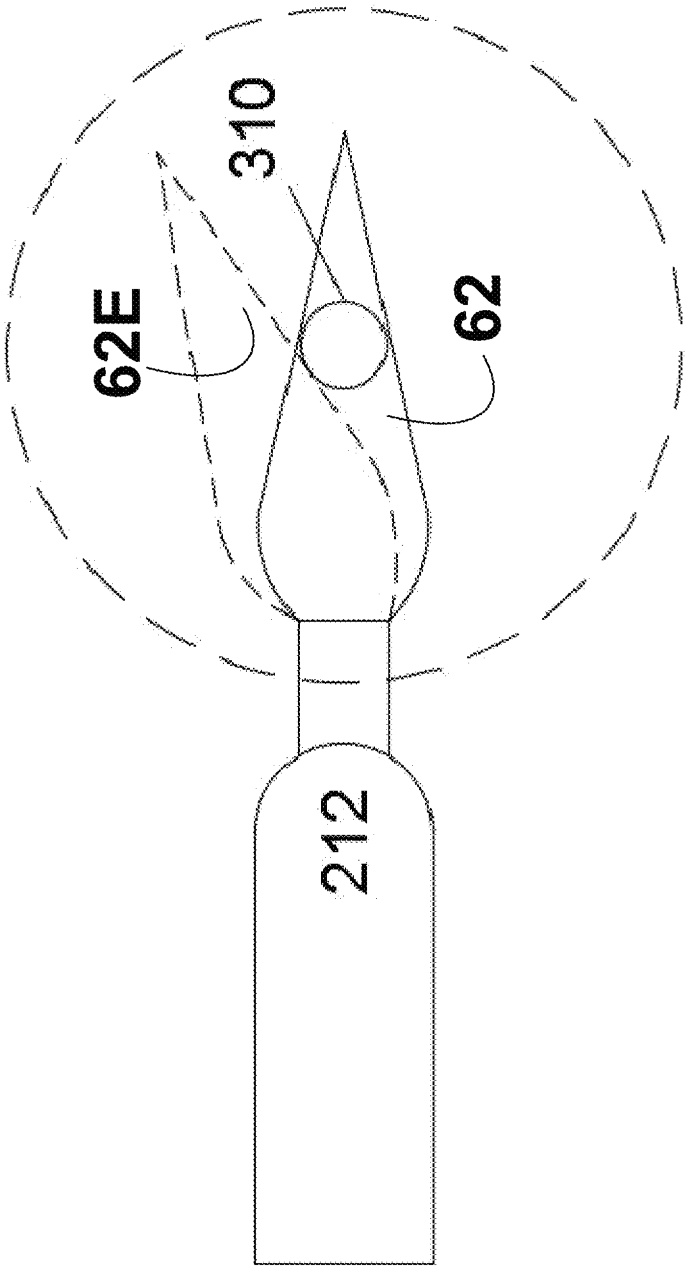
FIG. 3*e* is a diagram illustrating an example of a top view of a cathode revolving around a center (which may or may not be the wire) and positional differences between a plasma plume involving plasma distortion and a plasma plume without plasma distortion.

FIGS. 3*d* and 3*e* illustrate examples of plasma distortion 808. Such distortion can be embodied in a plasma plume 62E that is not properly oriented (FIG. 3*e*) or a plume 62 that is either too large or too small (FIG. 3*d*). As illustrated in FIG. 2*g*, plasma distortion 808 is a condition 800 that can be identified by looking at the waveform 750 of electrical measurements 652. Plasma distortion rate of change 809 is a time derivative (rate of change over time) of the plasma distortion 808.

The supply and/or direction of gas 510 to the torch assembly 200 can also result in an undesirable condition 800 such as plasma distortion 808. If there is insufficient gas 510, then there will likely be insufficient plasma for the plasma arc 60 to be sustained across the gap 61. This interruption in connectivity can be detected from the electrical measurement 652 captured by the sensor 650.

II. Alternative Embodiments

The system 100 can be implemented with respect to virtually any prior art apparatus 50. The system 100 can be implemented using a wide variety of different components and component configurations. The system 100 can also be implemented using a wide variety of different sensors 610 to capture a wide variety of different sensor measurements 650. The processor 710 used to trigger automated responses 770 without human intervention can trigger such responses 770 based on a single input or a complex heuristic involving many different inputs.

Different embodiments of the system 100 can trigger different responses 770 to different conditions 800 using different sensor measurements 650. Different embodiments of the system 100 can utilize different processing rules for the triggering of responses 770.

Many embodiments of the system 100 will involve measurements 650 captured over time so that patterns and trends in the data can be identified. Some but not all of the data processed by the IT assembly 700 can be in the form a waveform 750.

No patent application can disclose through text descriptions or graphical illustrations all of the potential embodiments of an invention. In accordance with the provisions of the patent statutes, the principles and modes of operation of the system are explained and illustrated with respect to certain preferred embodiments. However, it must be understood that the components, configurations, and methods described above and below may be practiced otherwise than is specifically explained and illustrated without departing from its spirit or scope. Each of the various components and assemblies elements described in the glossary set forth in Table 1 below can be implemented in a variety of different ways while still being part of the spirit and scope of the invention.

III. Incorporated References

The system 100 is an improvement to prior art apparatuses 50 that can be incorporated into virtually any prior art apparatus 50. Prior art PTWA technology is discussed in the following patent references, all of which are hereby incorporated by reference in their entirety (collectively, the "incorporated references"): (1) U.S. Pat. No. 5,808,270

("Plasma transferred wire arc thermal spray apparatus and method" filed on Feb. 14, 1997); (2) U.S. Pat. No. 5,938,944 ("Plasma transferred wire arc thermal spray apparatus and method" filed on Apr. 9, 1998); (3) U.S. Pat. No. 6,372,298 ("High deposition rate thermal spray using plasma transferred wire arc" filed on Jul. 21, 2000); (4) U.S. Pat. No. 6,706,993 ("Small bore PTWA thermal spraygun" filed on Dec. 19, 2002); (5) U.S. Pat. No. 8,581,138 ("Thermal spray method and apparatus using plasma transferred wire arc" filed on Dec. 22, 2011); (6) U.S. Published Application 20150376759 ("Device for thermally coating a surface" filed on Dec. 19, 2013) and (7) U.S. Published Application 20160001309 ("Device for thermally coating a surface" filed on Dec. 18, 2013).

IV. Prior Art PTWA Apparatuses

Figure 1B:
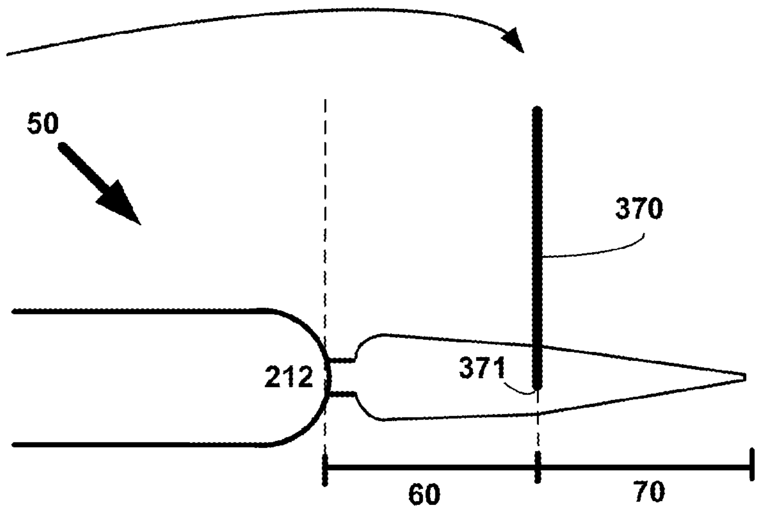
Prior Art Figure 1b
FIG. 1*b* is an abbreviated cross-section diagram illustrating an example of a plasma arc from the cathode to the free end of the wire being created by a prior art PTWA system.
Figure 1C:
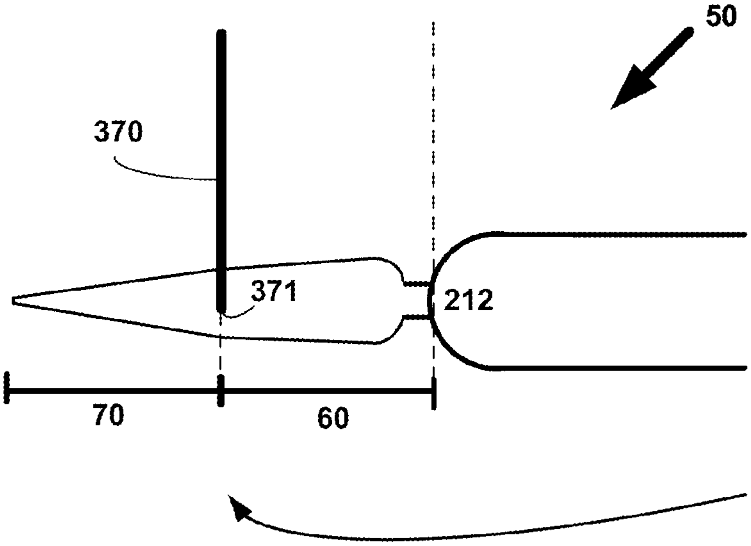
Prior Art Figure 1c
FIG. 1*c* is an abbreviated cross-section diagram similar to FIG. 1*b*, except that the rotational position of the cathode of the prior art PTWA system is 180 degrees from the position illustrated in FIG. 1*b*.

FIGS. 1*a*-1*d* illustrate examples of prior art PTWA apparatuses 50 and the relationship between a plasma arc 60 across a gap 61 between a cathode 212 and a free end 370 of the wire 310. FIG. 1*e* illustrates that the gap 61 is part of the electrical pathway 492. FIGS. 3*a*-3*e* illustrate examples of undesirable operating conditions 800 that can be detected by processing electrical measurements 652 captured over time as a waveform 750. FIGS. 5*a*-5*f* illustrate examples of waveforms 750 that can be used to identify undesirable operating conditions 800 in a prior art PTWA apparatus 50.

A. Combination of Coordinated Processes

The purpose of a properly functioning prior art PTWA apparatus 50 is to melt and atomize the material in the free end 370 of the wire 310 so that the atomized particles 74 can form a stream 70 directed to a desired surface 80 on a desired substrate 84. As illustrated in FIG. 1*a*, the portion of the wire 310 that is exposed to being melted and atomized is a free end 370 of the wire 310 which includes the end tip 371.

This highly complex process of spraying a stream 70 of predominantly atomized particles 74 onto a surface 80 involves coordinating several processes under substantially tight tolerances. Such processes include: (1) sustaining a steady plasma arc 60 between a cathode 212 in the torch assembly 200 and a free end 370 of the wire 310; (2) moving the wire 310 toward the gap 61 as its free end 370 is atomized in the plasma arc 60; (3) the delivery of electricity 490 to the cathode 212; (4) the delivery of gas 510 to the cathode 212; and (5) rotating a cathode 212 around a central point of rotation that is either the location of the wire 310 or a center point that is slightly offset with respect to the position of the wire 310. The thermal spraying process can provide substantial benefits to a surface 80 being targeted with a stream of atomized particles 74 from a prior art PTWA apparatus 50. Unfortunately, if the underlying parameters of the apparatus 50 deviate from acceptable ranges, the output of the apparatus 50 is not a finely atomized particle 74 stream but rather is a stream which includes non-atomized particles 72. Such non-atomized particles 72 are molten, and if the globules of molten material are sufficiently large, they are commonly referred to as "spits" 71. The benefits of a PTWA apparatus 50 result from the spraying of a stream 70 of finely atomized particles 74, and not from the spraying of non-atomized particles 72. Moreover, the spraying of spits 71 can actually damage the substrate 84, resulting in a waste of time, money, and materials.

Figure 1D:
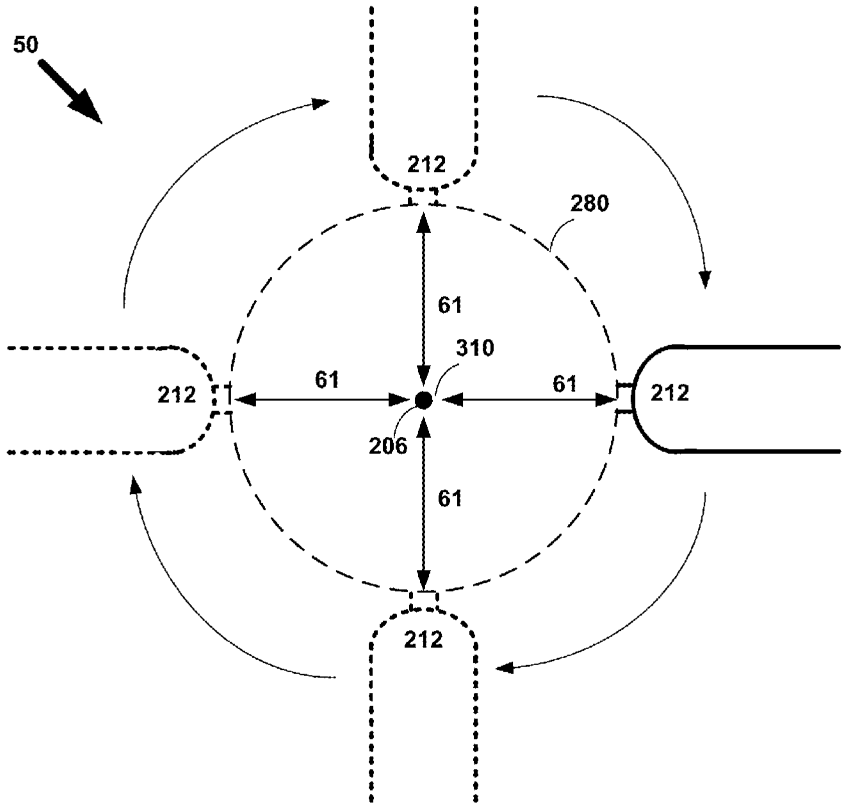
Prior Art Figure 1d
FIG. 1*d* is an abbreviated top planar view diagram illustrating an example of a prior art PTWA system that includes a cathode (the rest of the torch assembly which is not displayed in the figure) rotating around the longitudinal axis of the wire. The magnitude of the "gap" between the cathode and the free end of the wire is ideally identical at each spot in the rotational path of the cathode.
Figure 1E:
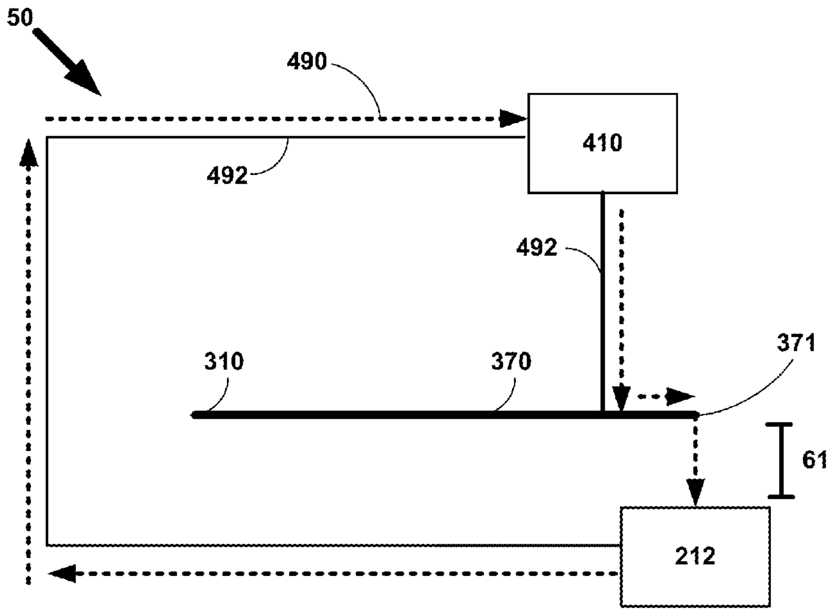
Prior Art Figure 1e
FIG. 1*e* is an abbreviated block diagram showing a prior art PTWA system with a direct current circuit connecting the power source to the wire, the wire to the gap in which the plasma arc is created, the gap to the cathode of the torch assembly, and the torch assembly back to the power source.

As illustrated in FIGS. 1*d* and 1*e*, the proper functioning of a prior art PTWA apparatus 50 requires connectivity in the form of a plasma arc 60 across a "gap" 61 of gas. The gap 61 is from the cathode 212 of the torch assembly 200 to a free end 370 of the wire 310. In the context of a DC circuit, a circuit or electrical pathway 492 distributes electricity 490 to the various components of the PTWA apparatus 50, and the gap 61 is a potential open in the circuit 492. Under normal conditions, air does not conduct electricity 490. Sufficient plasma, which is created through the use of gas 510 and the availability of electricity 490, is needed to create the conditions necessary in order to create and sustain the plasma arc 60 across the gap 61.

FIG. 1*a* is an abbreviated cross-section diagram illustrating an example of certain components in a prior art PTWA apparatus 50. The illustration shows a free end 370 of a wire 310 in position for the creation of a plasma arc 60 between the cathode 212 and the free end 370 of the wire 310.

The wire 310 is moved through rollers 340 and a guide tip 330 before reaching the position for the creation and sustaining of the plasma arc 60 where a free end 370 of the wire 310 is to be melted, atomized, and otherwise consumed by the plasma arc 60.

Gases 510 are provided from a gas assembly 500 through gas ports 530. A cathode 212 within the torch assembly 200 provides for creating and sustaining the plasma arc 60, contingent upon having access to the necessary inputs.

Not labelled in the abbreviated diagram of FIG. 1*a* is a nozzle 220 in the torch assembly 200 that helps to direct the plasma arc 60 and the resulting particle stream 70. Other components of the torch assembly 200, the wire delivery assembly 300, the gas delivery assembly 500, and the power delivery assembly 400 are discussed below, in Table 1, in FIGS. 6*b* and 6*c*, as well as in the incorporated references.

B. Rotational Movement of the Torch Assembly

FIG. 1*b* is an abbreviated cross-section diagram illustrating an example of a plasma arc 60 from the cathode 212 to the free end 370 of the wire 310 being created by a prior art PTWA apparatus 50. As illustrated in FIG. 1*b*, the cathode 212 (along with the rest of the torch assembly 200 which is not displayed in the figure) rotates around the longitudinal axis of the wire 310 (i.e. the rotational centerline 206). This movement is important because the plasma arc 60 must be sustained in all of the different positions of the torch assembly 200. The operating conditions 800 of bent wire 801 and wire feed motion 805 are triggered by variances in the magnitude of the gap 61 that results from the underlying variance of geometric position. FIG. 1*c* is an abbreviated cross-section diagram similar to FIG. 1*b*, except that the rotational position of the cathode 212 of the prior art PTWA apparatus 50 is 180 degrees from the position illustrated in FIG. 1*b*.

FIG. 1*d* is an abbreviated top planar view diagram illustrating an example of a prior art PTWA apparatus 50 that includes a cathode 212 (along with the rest of the torch assembly 200 which is not displayed in the figure) rotating around the rotational centerline 206 (a center of rotation) that is the same position as the wire 310. If the wire 310 is perfectly straight, then the magnitude of the "gap" 61 between the cathode 212 and the free end 370 of the wire 310 is identical at each spot in a rotational path 280 of the cathode 212. In the case of bent wire condition 801 and/or wire feed motion condition 805, differences will arise in the various gaps 61 at different locations along the rotational path 280.

C. PTWA Circuit/Electrical Pathway

FIG. 1*e* is an abbreviated block diagram showing a prior art PTWA apparatus 50 with a direct current circuit 492 connecting the power source 410 to the wire 310, the wire 310 to the gap 61 in which the plasma arc 60 is created, from the gap 61 to the cathode 212 of the torch assembly 200, and the torch assembly 200 back to the power source 410.

The difference between a prior art PTWA apparatus 50 and the applicant's inventive system 100 is the use of a sensor 610 such as an electrical sensor 611 or a high speed electrical sensor 612 to capture electrical measurements 652 over time that are subsequently processed by a processor 710 as a waveform 750. One or more attributes of the waveform 750 can be used by a processor 710 to automatically trigger a response 770 to an undesirable operating condition 800. An electrical sensor 611 can be positioned at any location in the electrical pathway 492 that includes the gap 61 across which the plasma arc 60 is formed and sustained in the operation of the system 100. The processor 710 can similarly be located virtually anywhere in an apparatus 110 or even outside the apparatus 110.

V. Undesirable Conditions, Waveforms, and Responses

The intended purpose of a prior art apparatus 50 as well as the innovative system 100 and apparatus 110 is to create a suitable plasma arc 60 across a gap 61 within desired parameters. Such a plasma arc 60 is intended to create a desired particle stream 70 comprised substantially of atomized particles 74 originating from the wire 310. It is not desired for the particle stream 70 to be comprised largely of non-atomized particles 72, although the inclusion of some such material is to some extent inevitable. The system 100 can avoid the concentration of non-atomized particles 72 from becoming too large in the particle stream 70 by identifying the underlying conditions 800 that can fall out of tolerance. The system 100 can rectify the problems through warnings 772 or even automatic adjustments 790.

A. Conditions

FIGS. 2*d* and 2*g* illustrate examples of undesirable conditions 800 that can be detected by processing electrical measurements 652 as a waveform 750.

To project atomized particles 74 instead of molten globules 72, it is required that the wire 310 be melted and atomized in the plasma arc 60, with the particulate matter being projected in the desired particle stream 70 onto a desired surface 80. The benefits of such a process can be substantial. However, it is a process with tight operating parameters such as the parameters relating to the electricity 490 that "jumps" across the gap 61. If one of the underlying processes is not functioning properly, the output of the system 100 will be an undesirable condition 800, not a stream 70 of well atomized particles 74 suitable for spraying.

The further the operating parameters become out of tolerance, the more likely non-atomized particles 72 and even a spit 71 is to be sprayed onto the desired surface 80 of the substrate 84. Spit 71 occurs when a large molten globule 72 is formed out of the wire 310 and propelled to the substrate 84 or surface 80 that is the target of the spraying process. Spit 71 results in waste. Wasted time in running the system 100 without generating useful results. Wasted materials in terms of the wire 310, the surface 80 on which the particle stream 70 was to enhance, and in terms of the electricity 490 and gas 510 used by the prior art apparatus 50. In contrast, a monitored system 100 can avoid such waste.

Potential responses 770 can include warnings 772 as well as automatic adjustments 790 that are made by the system 100. As illustrated in FIG. 2*d*, there are at least several categories of relevant conditions 800 that can be detected using a waveform 750 of electrical measurements 652 captured over time. Some conditions 800 relate to the wire delivery assembly 300 such as wire curvature 801, wire curvature rate-of-change 802, and wire feed motion 805. Other conditions 800 relate to the movement of the cathode 212 in its orbit 280 around a rotational centerline 206, such as torch RPM 803 or torch RPM rate-of-change 804. Other conditions 800 relate to the movement of electricity 490 along the electrical pathway 492 such as a poor electrical contact 806 or a rotationally-dependent poor electrical contact 807. Still other conditions 800 relate to the gas 510 that is heated and delivered across the gap 61, such as plasma distortion 808 or the plasma distortion rate-of-change 809. Many of these conditions 800 can result in spit 71 or other forms of waste if not corrected in a proactive manner.

FIG. 3*a* illustrates a context of a system 100 that is experiencing the condition 800 of undesirable wire curvature 801. FIG. 3*b* illustrates a context of a system 100 that is experiencing undesirable wire feed motion 805. FIG. 3*c* illustrates a context of a system 100 that is experiencing poor electrical contact 806. FIGS. 3*d* and 3*e* illustrate examples of a system 100 that is experiencing plasma distortion 808.

B. Waveforms

Examples of waveforms 750 and waveform attributes are illustrated in FIGS. 2*i* and 5*a*-5*f*. FIG. 2*g* is a chart that serves to associate certain attributes of waveforms 750 (which are comprised of electrical measurements 652) to certain detectable conditions 800. FIG. 2*i* discloses a waveform 750 that has attributes such as a peak-to-peak value 751, a period 753, and an average value 758.

Figure 5A:
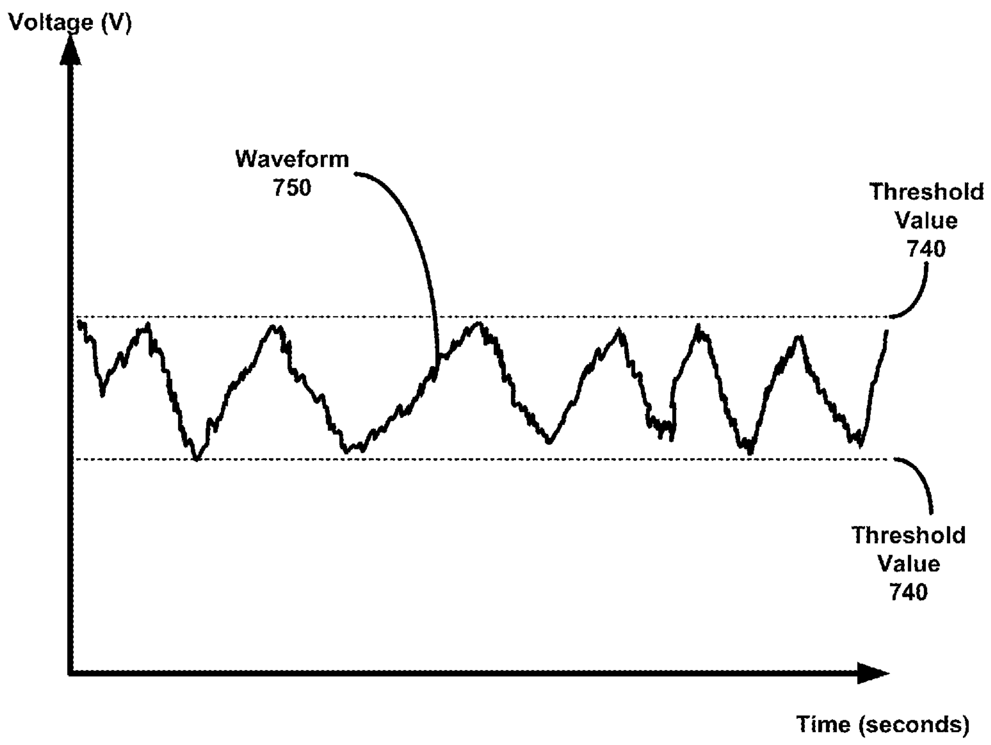
FIG. 5*a* is a waveform diagram illustrating an example of a waveform of voltage measurements falling within a range of threshold values.

FIG. 5*a* reveals an example of voltage measurements 654 within a range of acceptable threshold values 740. Such results suggest a system 100 operating where the gap 61 is not varying significantly with the orbit 280 of the cathode 212. Contrast FIG. 1*d* where the gap 61 is constant with FIG. 3*a* which illustrates an example of a relatively larger gap 61B and a relatively smaller gap 61A caused by a bend in the free end 370 of the wire 310.

Figure 5B:
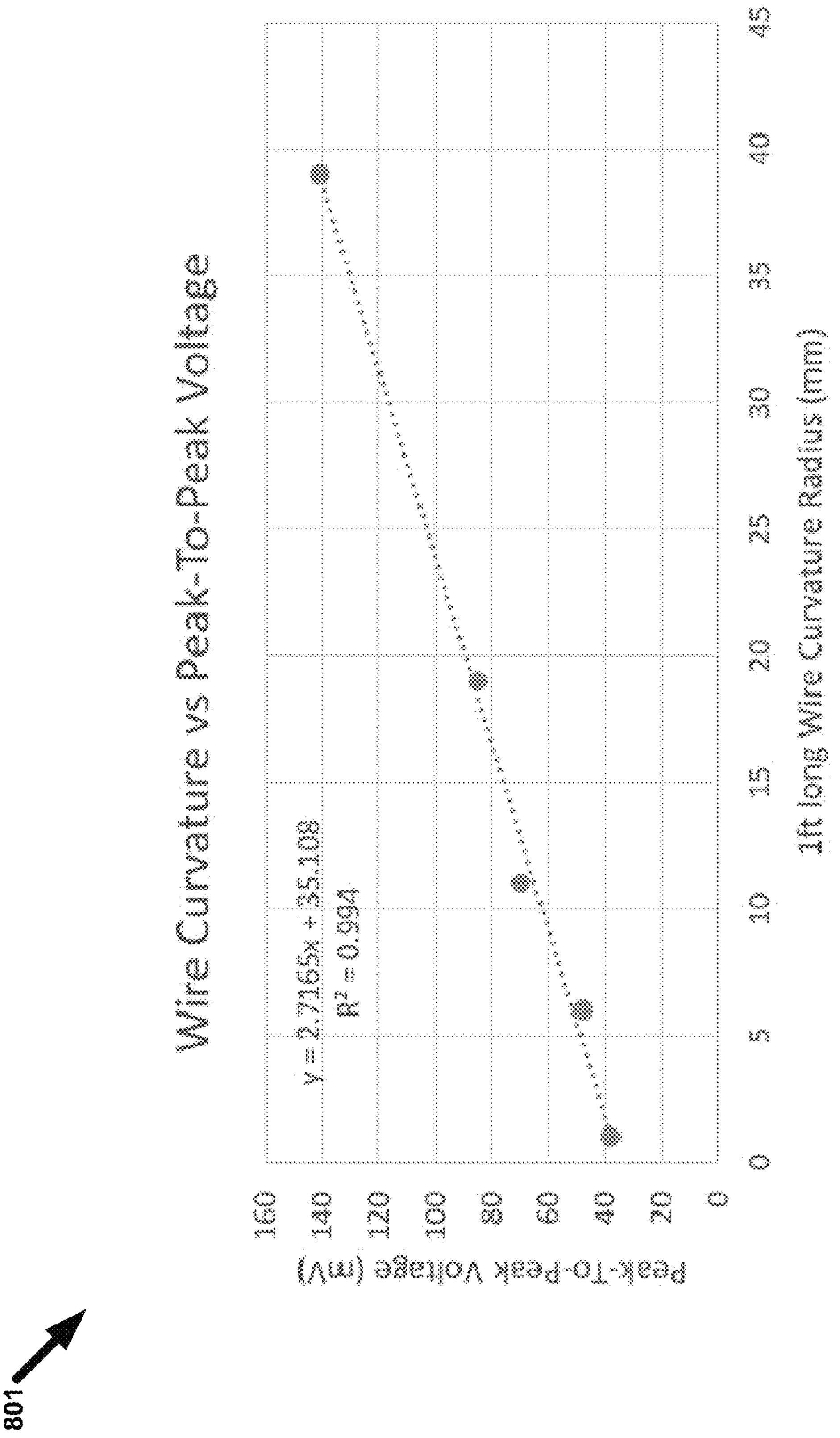
FIG. 5*b* is a graph of waveform characteristics illustrating an example of how a bent wire can impact a peak-to-peak voltage waveform.
Figure 5C:
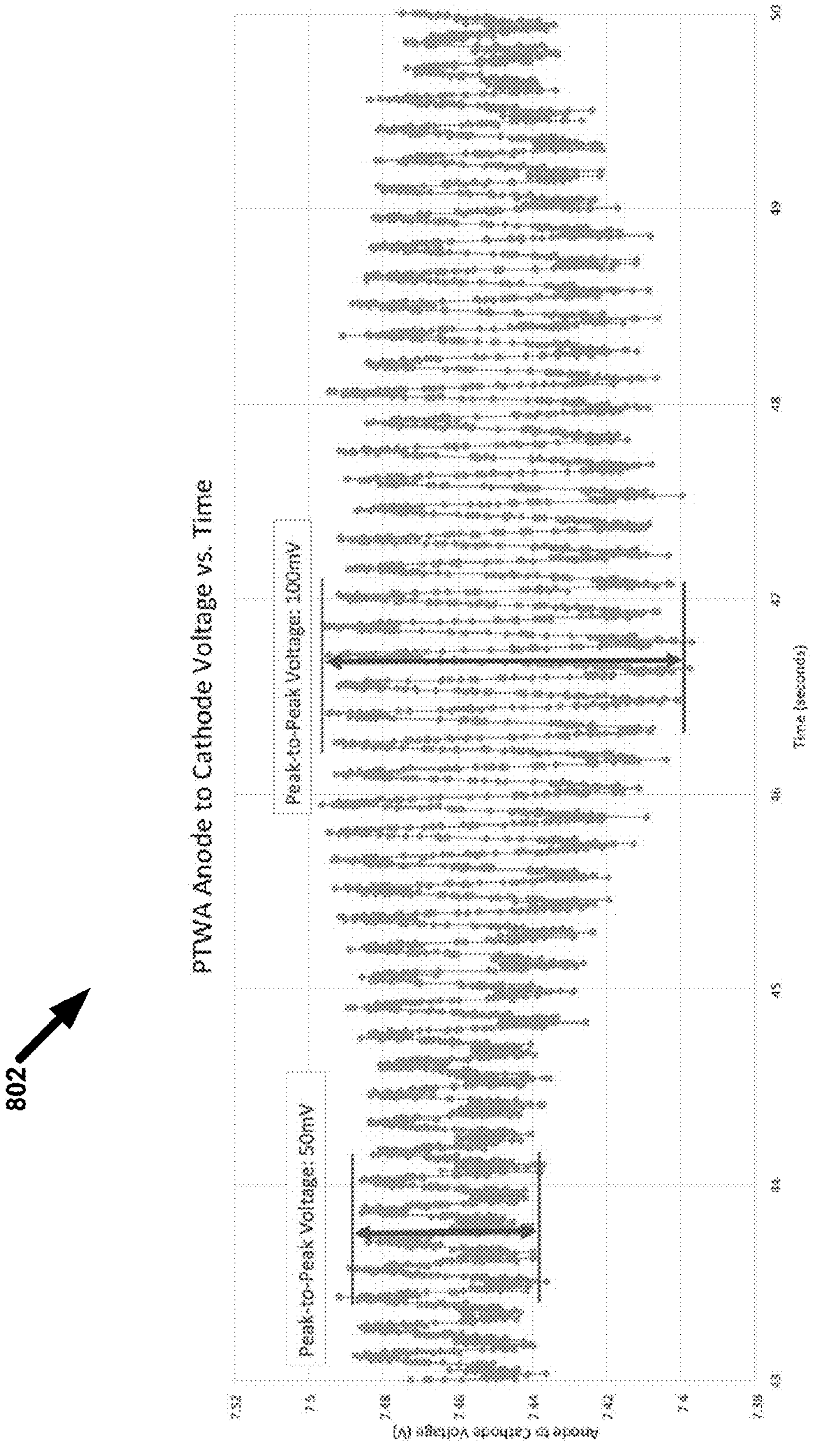
FIG. 5*c* is a waveform diagram illustrating an example of different peak-to-peak voltages.
Figure 5D:
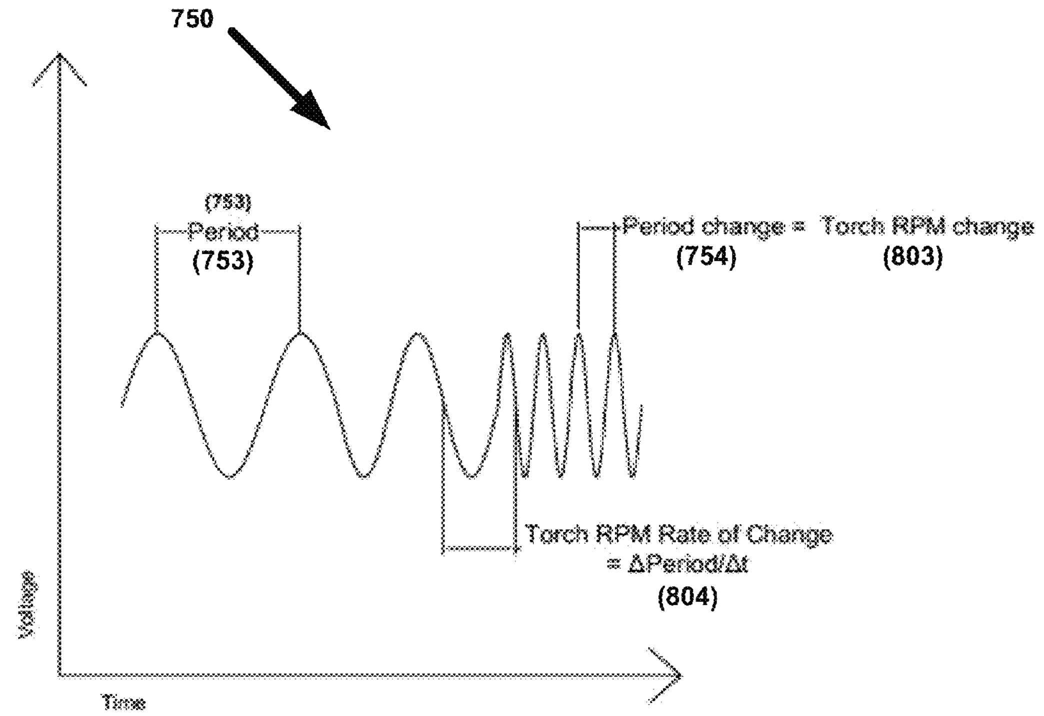
FIG. 5*d* is a waveform diagram illustrating an example of torch rotation measurements.
Figure 5E:
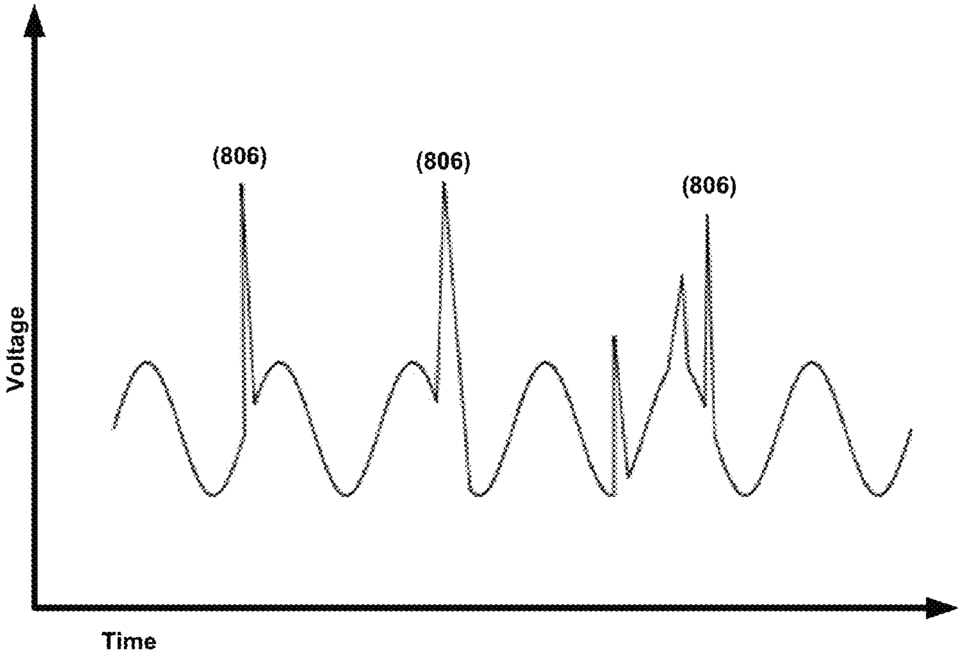
FIG. 5*e* is a waveform diagram illustrating an example of a poor electrical contact.
Figure 5F:
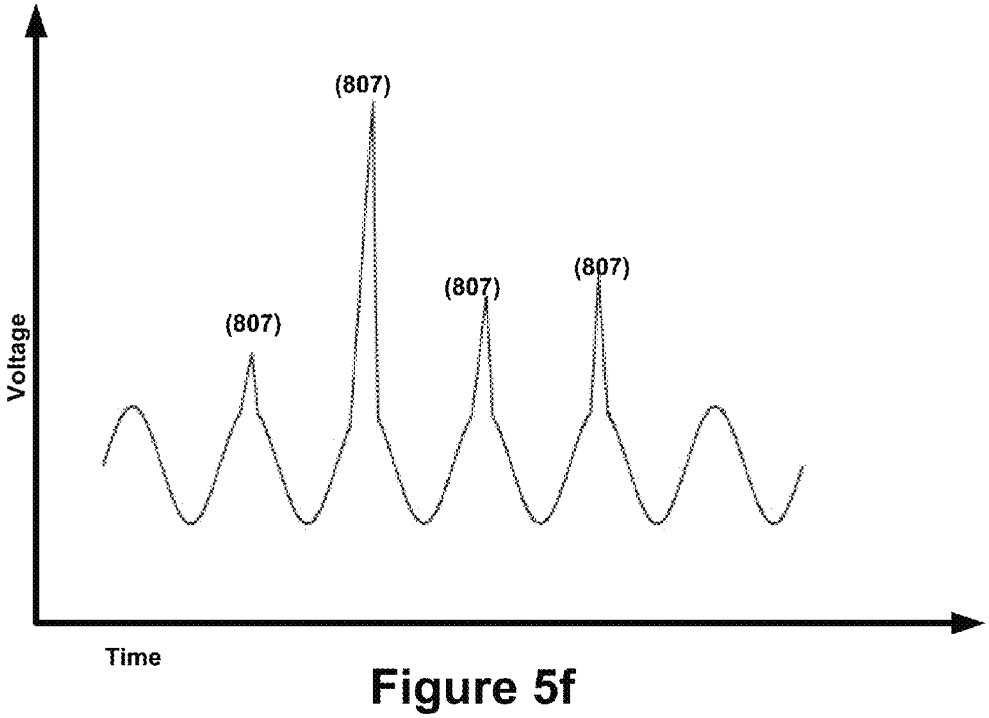
FIG. 5*f* is a waveform diagram illustrating an example of a rotationally-dependent poor electrical contact.

FIG. 5*b* is a waveform analysis that relates to the wire curvature 801. FIG. 5*c* illustrates how peak-to-peak values 751 can be used to differentiate the operations of the system 100. FIG. 5*d* discloses a potential relationship between a period rate of change attribute 754 and a torch RPM condition 803. FIGS. 5*e* and 5*f* illustrate examples of poor electrical contact 806 and rotationally-dependent poor electrical contact 807.

C. Responses

FIG. 2*h* illustrates an example of different categories and subcategories of responses 770 that can be generated by the system 100. Responses 770 can also correspond with different aspects of the system 100. For example, warnings 772 can relate to an attribute of: (1) the wire delivery assembly 300 (a wire warning 773); (2) the gas delivery assembly 500 (a gas warning 774); (3) the power delivery assembly 400 (a power warning 775); or (4) the torch assembly 200 (a plasma distortion warning 776). Automatic adjustments 790 can similarly be implemented for different assemblies as an output to different combinations of inputs.

Responses 770 can also correlate or otherwise be mapped to/correspond with different identified operating conditions 800. Each of the conditions 800 in FIGS. 2*d* and 2*g* can be associated with a particular warning 772 and/or automatic adjustment 790.

VI. Method of Thermal Spraying

Figure 4A:
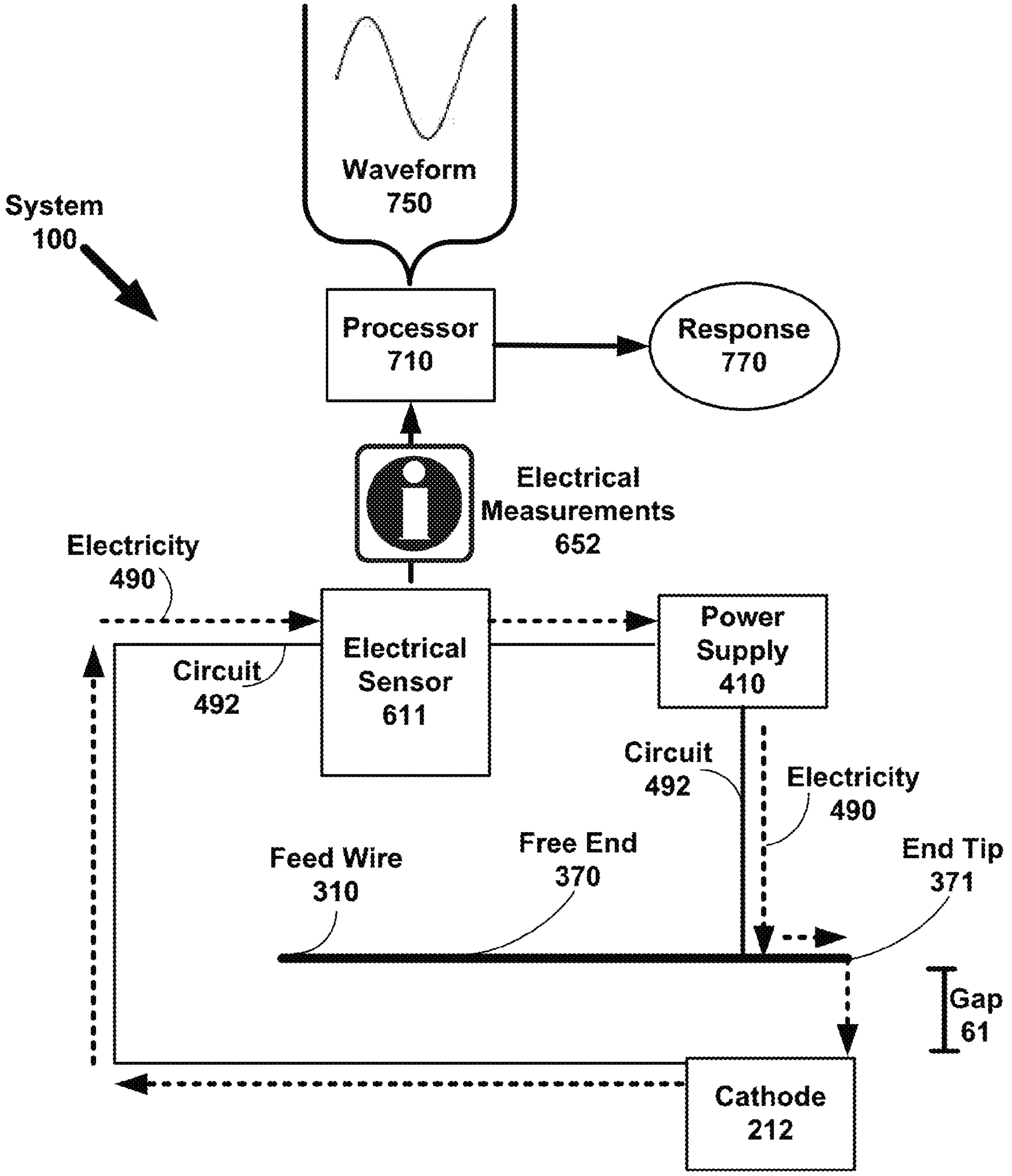
FIG. 4*a* is a block diagram illustrating an example of a system that includes an electrical sensor that transmits electrical measurements to a processor. The system can selectively generate a response to such measurements.
Figure 4B:
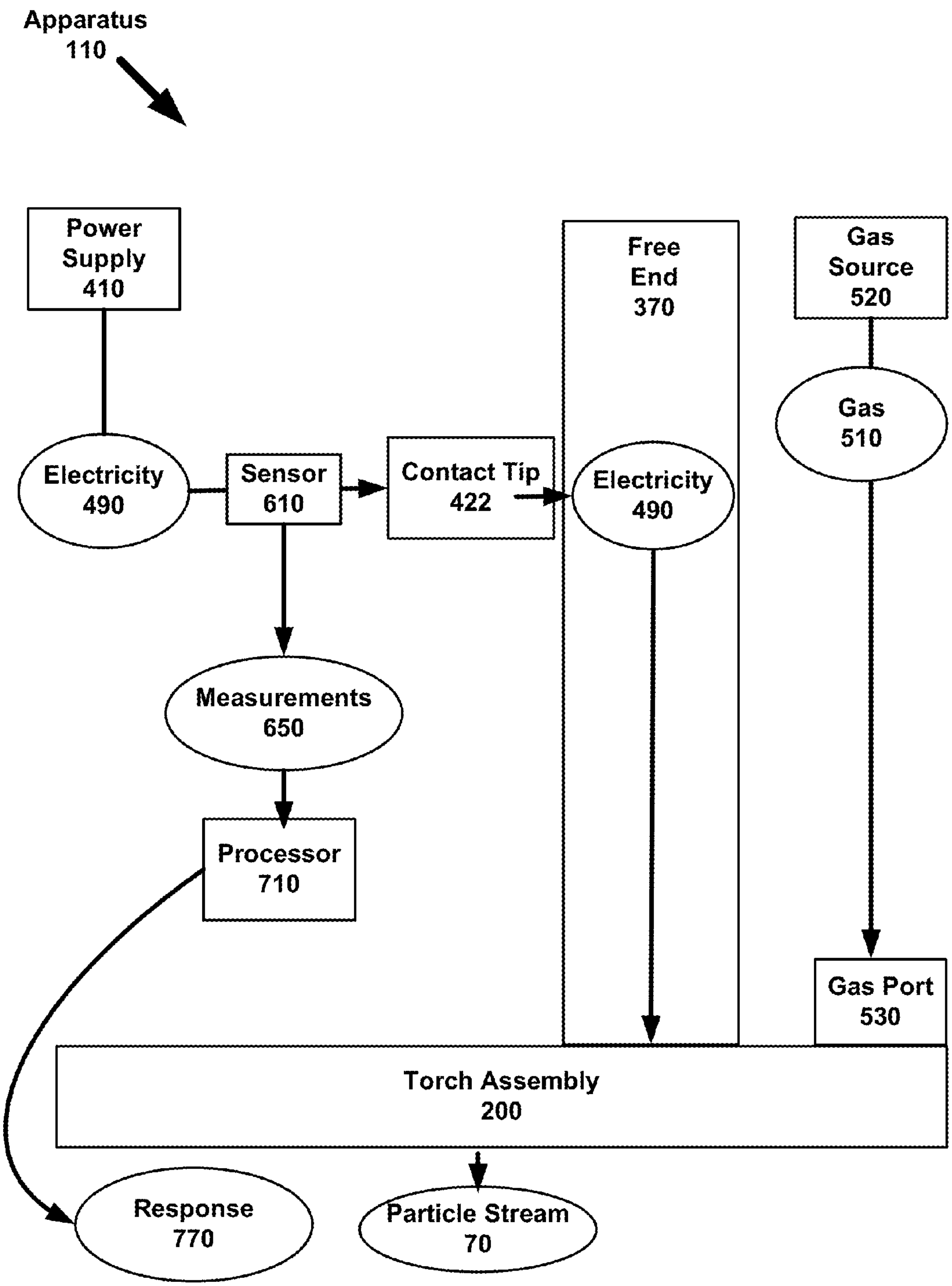
FIG. 4*b* is a block diagram illustrating an example of a system that uses a sensor from one of a variety of potentially different locations along the applicable DC (direct current) circuit.
Figure 4C:
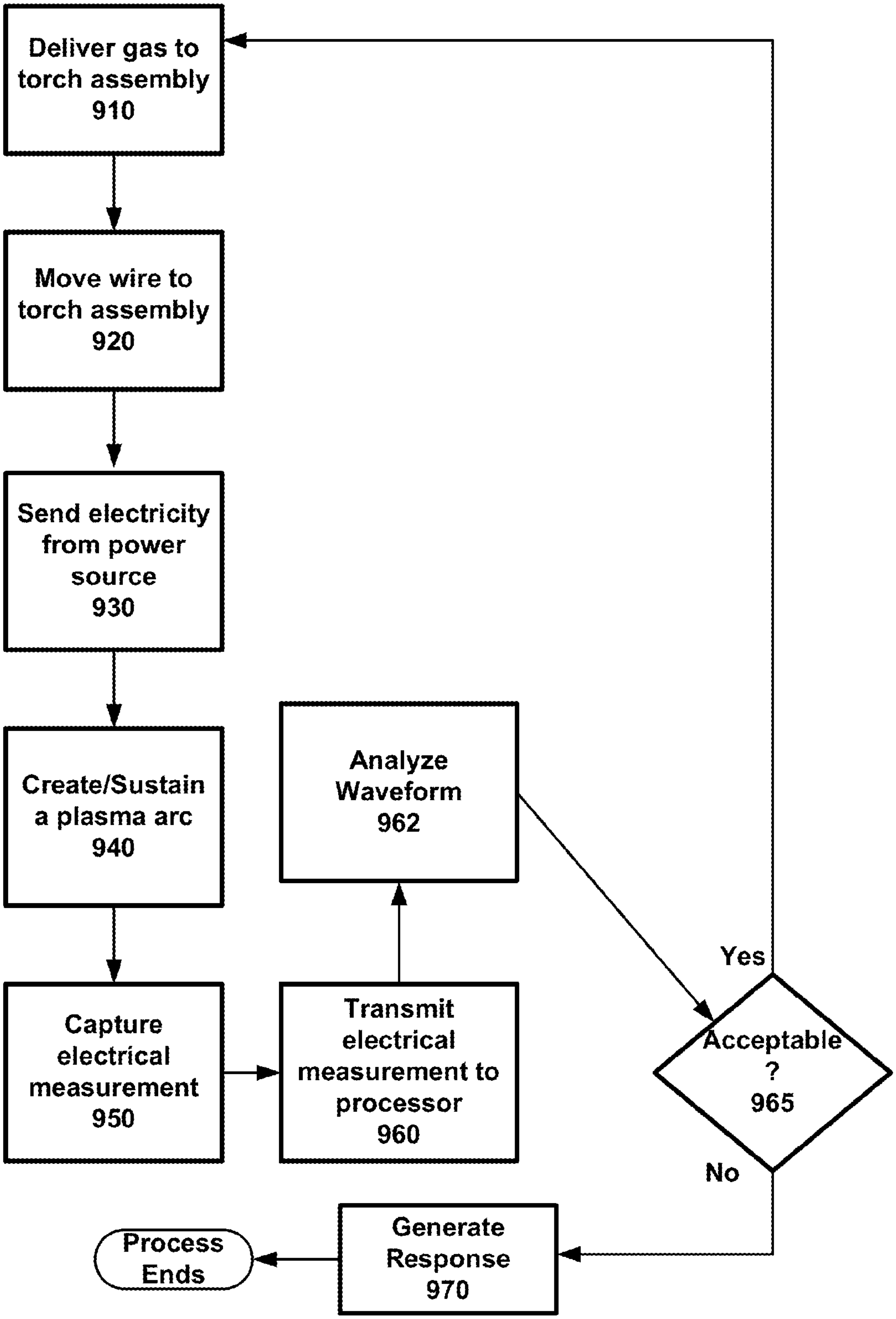
FIG. 4*c* is a flow chart diagram illustrating an example of a processor utilizing electrical measurements in the form of a waveform to trigger a response to the operating conditions of the system.

FIG. 4*c* is a flow chart diagram illustrating an example of a method 900 of thermal spraying in which a sensor 610 is used to capture sensor readings 650 that can trigger a processor 710 to generate a response 770 without any human intervention. In FIG. 4*c*, steps 910 through 940 reflect processes performed by a prior art apparatus 50 and steps 950 through 970 illustrate processes that are not performed by a prior art apparatus 50. The system 100 can transform a prior art apparatus 50 through the use of one or more sensors 610 such as an electrical sensor 611 used to capture electrical measurements 652 over time. Such measurements 652 can be processed as a waveform 750 by the processor 710 to selectively generate a response 770 automatically without human intervention.

At 910, gas 510 is delivered to a torch assembly 200. This is typically achieved by the movement of gas 510 from a gas source 520 through a gas port 530 to a torch assembly 200.

At 920, the wire 310 is moved towards the torch assembly 200. This involves a movement of a free end 370 of the wire 310 through the rollers 340 and through a guide tip 330 towards the position of the gap 61 and the desired plasma arc 60.

At 930, electricity 490 is delivered from a power source 410. The electrical pathway 492 includes the power source 410, the cathode 212, a contact tip 422, and the wire 310.

At 940, a plasma arc 60 is created and sustained across the gap 61 between the cathode 212 and the free end 370 of the wire 310.

At 950, an electrical measurement 652 is captured with an electrical sensor 611.

At 960, the electrical measurement 652 is sent to a processor 710.

At 962, the processor 710 processes the measurements 650 as a waveform 750. The waveform 750 can be analyzed at 962 to determine at 965 whether or not there is a problematic condition 800 that merits a response 770. That determination can be made on a selective basis by processing a waveform 750 of the electrical measurements 652. FIG. 2*c* compares the most recent electrical measurement 652 in the context of prior electrical measurements 652, one or more threshold values 740, and other operating parameters of the system 100. FIG. 2*g* discloses a chart of conditions 800 and corresponding attributes of a waveform 750 in the context of electrical measurements 652.

If the processor 710 at 965 determines that the torch assembly 200 is operating within acceptable parameters, the process returns to 910 with the continued sustaining of the plasma arc 60.

If the processor 710 at 965 determines that the torch assembly 200 is not operating within acceptable parameters, a response 770 is generated at 970.

The response 770 may constitute a warning 772 and/or an automatic adjustment 790. The plasma arc 60 and the operation of the torch assembly 200 may or may not continue after the response 770.

V. System and Apparatus Embodiments

The system 100 will often, but not necessarily always, be implemented in the form of an integrated apparatus 110. FIGS. 4*a*-4*b* and 6*a*-6*c* illustrate various embodiments of systems 100 and apparatuses 110 at various levels of detail.

A. FIG. 4*a*

FIG. 4*a* is a block diagram illustrating an example of a system 100 that utilizes an electrical sensor 611 to capture electrical measurements 652 which can be processed by a processor 710 as a waveform 750 to generate a response 770.

The electrical sensor 611 can be positioned potentially anywhere along a circuit 492 through which electricity 490 travels. The power supply 410 provides current that travels through the circuit 492 which includes the gap 61 between the cathode 212 and the free end 370 of the wire 310.

B. FIG. 4*b*

FIG. 4*b* is a block diagram illustrating an example of an apparatus 110 that utilizes a sensor 610 (often a high speed voltage sensor 614) to capture electrical measurements 652 over time which can be used by a processor 710 to generate a response 770 from a waveform 750 of such electrical measurements 652.

Gas 510 is delivered from a gas source 520 to a gas port 530, making the gas 510 accessible to the torch assembly 200.

The power supply 410 provides electricity 490 that travels through an electrical pathway 492. The electrical pathway 492 includes the portion of the wire 310 from the contact tip 422 to the free end 370 of the wire 310 and the cathode 212 in the torch assembly 200.

Figure 6A:
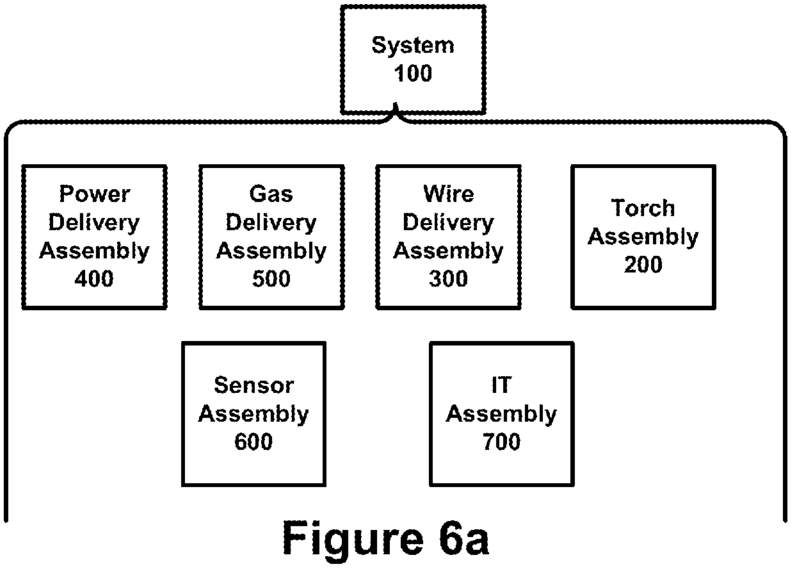
FIG. 6*a* is a block diagram illustrating an example of the different assemblies that can make up the system. The system can accommodate a wide variety of different assembly configurations, including virtually any prior art PTWA power delivery assembly, gas delivery assembly, wire delivery assembly, torch assembly, and IT assembly.

C. FIG. 6*a*

FIG. 6*a* is a block diagram illustrating different assemblies that can be included in the system 100 and apparatus 110.

A power delivery assembly 400 provides the electricity 490 to the torch assembly 200 so that torch assembly 200 can create and sustain a plasma arc 60 across the gap 61. The power delivery assembly 400 can deliver electricity 490 across an electrical pathway 492 using components such as a power supply 410 (typically a DC power source 412), a lead/contact 420, a contact tip 422 in contact with the wire 310, an insulating object 430 (such as a rubber ring 432 or an insulating block 434), and other electrical subassemblies, components, and parts known in the art.

A gas delivery assembly 500 provides gas 510 to the torch assembly 200 so that torch assembly 200 can create and sustain a plasma arc 60 across the gap 61. The gas delivery assembly 500 can provide for delivering different types of gases 510, including a plasma gas 512 that is transformed into an ionized plasma gas 516 as well as a secondary gas 518 such as air. The gas delivery assembly 500 can include multiple gas sources 520 such as a primary gas source 522 for the primary plasma gas 512 and a secondary gas source 524 for the secondary gas 518. The assembly 500 can also include a variety of ports 530, manifolds 550 and 560, plates such as a baffle plate 552, bores 562 to facilitate the movement of gas 510, and other subassemblies, components, and parts known in the art.

A wire delivery assembly 300 provides a free end 370 of a wire 310 to the torch assembly 200 so that torch assembly 200 can create and sustain a plasma arc 60 across the gap 61. Wire 310 is moved to the torch assembly 200 through rollers 340 that are powered by a speed-controlled motor 350. The wire 310 moves through a guide tip 330 to position the free end 370 of the wire 310 in the proper position for the plasma arc 60.

A torch assembly 200 takes the inputs of electricity 490, gas 510, and wire 310 to create and sustain a plasma arc 60 across the gap 61. The torch assembly 200 includes a cathode subassembly 210 that includes a cathode 212, a cathode holder 214, and gas ports 216 to facilitate the movement of plasma gas 512. The torch assembly 200 is typically enclosed in a surface referred to as a torch body 202. Within the torch body 202 is also a nozzle 220 such as an anode nozzle or plasma nozzle 222.

A sensor assembly 600 captures one or more sensor readings 650 from one or more sensors 610. The sensor readings 650 are sent to the IT assembly 700. The one or more sensors 610 can include voltage sensors 613 such as high speed voltage sensors 614, current sensors 615, frequency sensors 617, and other types of sensors 610. The range of sensor measurements 650 is commensurate with the range of different sensors 610, including voltage measurements 654, current measurements 653, frequency measurements 656, and/or potentially other types of measurements 650.

An IT assembly 700 can selectively identify operating conditions 800 and selectively trigger a response 770 to address the applicable operating condition 800. The IT assembly 700 can include one or more processors 710, running one or more applications/programs 712 and accessing data through a memory/RAM component 720. Data such as sensor measurements 650 can also be stored on a storage component 730, which may organize the data using a database 732. Historical data 734 can be stored on the database 732, and used to create and update threshold values 740 used by the processor 710 in identifying operating conditions 800. The IT Assembly 700 is responsible for generating responses 770 such as warnings 772 and automatic adjustments 790. An automatic adjustment 790 can impact the operation of any of the assemblies identified above, including the gas delivery assembly 500, the power delivery assembly 400, the wire delivery assembly 300, and the torch assembly 200.

D. FIGS. **6*b* and 6*c***

Figure 6B:
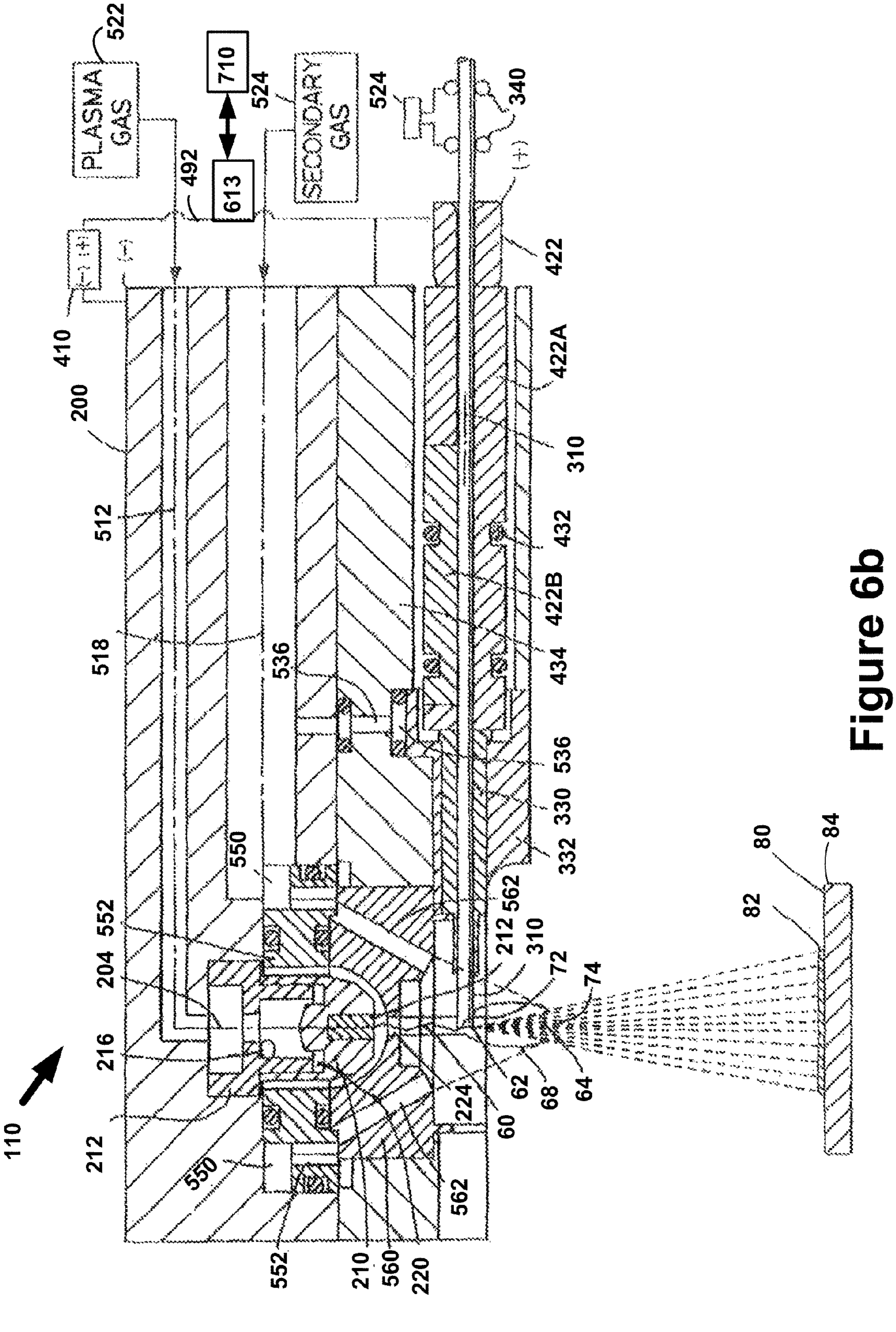
FIG. 6*b* is a schematic diagram illustrating an example of the system.
Figure 6C:
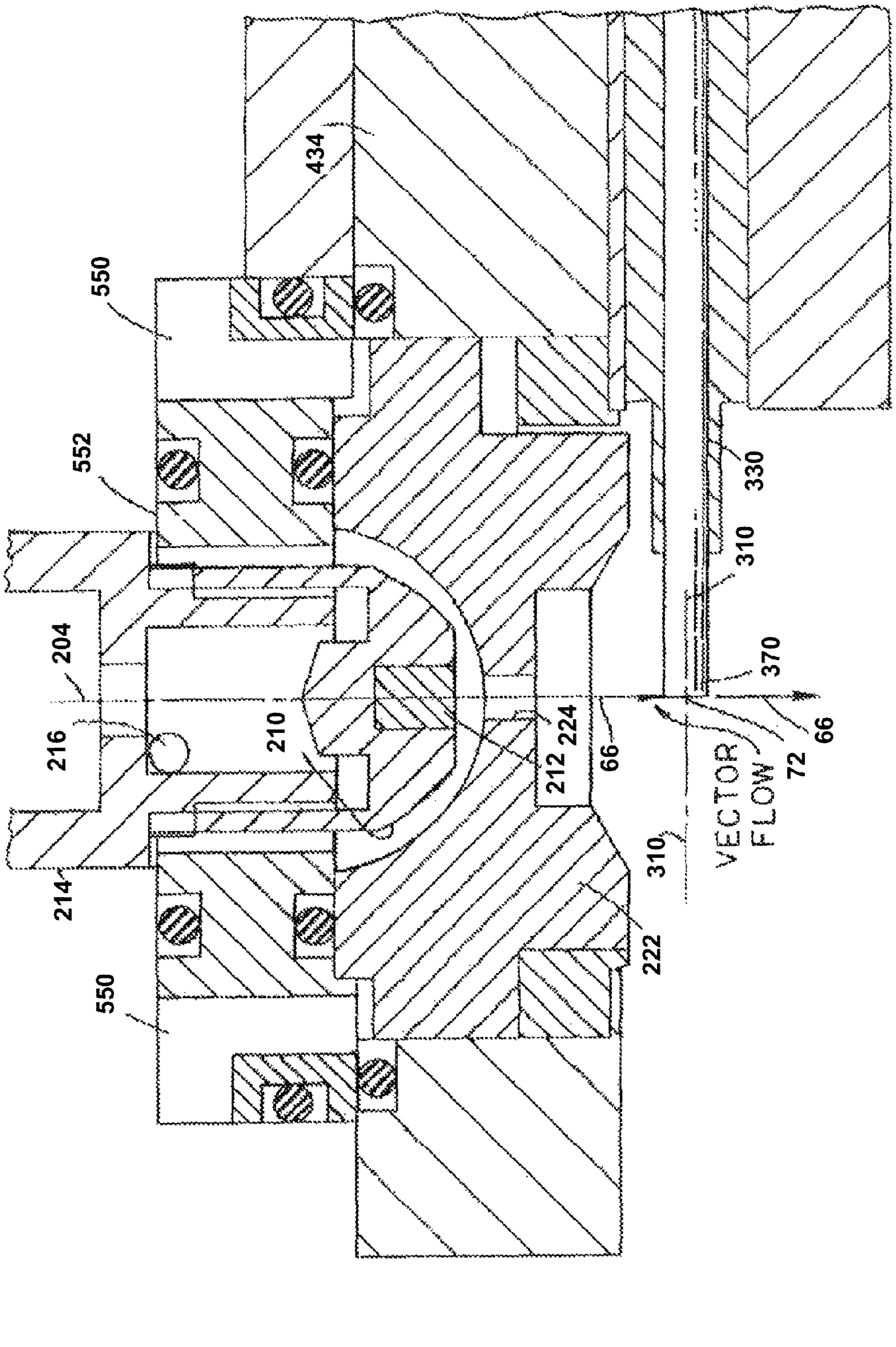
FIG. 6*c* is an enlarged representation of a portion of FIG. 6*b*.

FIG. **6*b* shows a schematic representation of a PTWA apparatus 110 that can include a sensor 610 such as a high speed voltage sensor 614 for capturing voltage measurements 654 that can be used by a processor 710 to create a response 770 to undesirable operating conditions 800. The sensor 610 can be positioned anywhere in the electrical pathway 492 within the apparatus 110. FIG. 6*c* is an enlarged representation of an anode nozzle 222 and a free end 370 of a wire 310 illustrated in FIG. 6*b***.

The apparatus 110 includes a torch body 202 containing a plasma gas port 532 and a secondary gas port 534. The torch body 202 is typically formed of an electrically conductive metal. The plasma gas 512 is connected by means of a plasma gas port 532 to a cathode holder 214 through which the plasma gas 512 flows into the inside of the cathode subassembly 210 and exits through gas ports 216 located in the cathode holder 214. The plasma gas 512 forms a vortex flow between the outside of the cathode subassembly 210 and the internal surface of the plasma nozzle 222, and then it exits through the constricting orifice 224. The plasma gas vortex provides substantial cooling of the heat being generated by the functioning of the cathode.

Secondary gas 518 enters the torch assembly 200 through secondary gas ports 534 which direct the secondary gas 518 to a gas manifold 550 (a cavity formed between a baffle plate 552 and the torch body 202 and then through bores 562). The secondary gas 518 flow is uniformly distributed through the equi-angularly spaced bores 562 concentrically surrounding the outside of the constricting orifice 224.

Wire feedstock 320 is used supply the plasma arc 60 with the material that is sprayed onto the surface 84. The wire 310 is directed by rollers 340 that are powered by a speed-controlled motor 350. The wire 310 moves through a wire contact tip 422 which is in electrical contact to the wire 310 as it slides through the wire contact tip 422. In this embodiment, the wire contact tip 422 is composed of two pieces, **422*a* and 422*b*, held in spring or pressure load contact with the wire 310 by means of a rubber ring 432 or other suitable means. The wire contact tip 422 is made of high electrically conducting material. As the wire 310 exits the wire contact tip 422, it enters a wire guide tip 330 for guiding the wire 310 into precise alignment with the axial centerline 204 of the constricting orifice 224. The wire guide tip 330 can be supported in a wire guide tip block within an insulating block 434 which provides electrical insulation between the main body 202, which is held at a negative electrical potential, while the wire guide tip block 332 and the wire contact tip 422 are held at a positive potential. In other embodiments, the wire guide tip 330 can be structurally integral with the nozzle 220. A small port 536 in the insulator block 434 allows a small amount of secondary gas 518 to be diverted through the wire guide tip block 332 in order to provide heat removal from the block 332. This can also be done via a bleed gas 510 around or through the nozzle 220. In some embodiments, the wire guide tip block 332 can be maintained in pressure contact with the plasma nozzle 222 to provide an electrical connection between the plasma nozzle 222 and the wire guide tip block 332. Electrical connection is made to the main body 202 and thereby to the cathode subassembly 210 (having cathode 212) through the cathode holder 214 from the negative terminal of the power supply 410. In some embodiments, the power supply 410 may contain both a pilot power supply and a main power supply operated through isolation contactors. Positive electrical connection can be made to the wire contact tip 422 from the positive terminal of the power supply 410. Wire 310 is fed toward the axial centerline 204 of the constricting orifice 224, which is also the axis of the plasma plume 62. Concurrently, the cathode subassembly 210 is electrically energized with a negative charge and the wire 310, as well as the plasma nozzle 222 although the plasma nozzle 222 can be isolated, it can be electrically charged with a positive charge. The wire guide tip 330 and wire 310 can be positioned relative to the plasma nozzle 222 by many different methods. In one embodiment, the plasma nozzle 222 itself can have features for holding and positioning of the wire guide tip 330. The torch body 202** may be desirably mounted on a power rotating support (not shown) which revolves the torch around the wire axis to coat the interior of bores.

To initiate operation of the apparatus 110, plasma gas 512 at an inlet gas pressure of between 50 and 140 psig is caused to flow through the plasma gas ports 532, creating a vortex flow of the plasma gas 512 about the inner surface of the plasma nozzle 222 and then, after an initial period of time of typically two seconds, high-voltage DC power or high frequency power is connected to the electrodes creating the plasma arc 60. Wire 310 is fed by means of wire feed rollers 340 into the plasma arc 60 sustaining it even as the free end 370 is melted off by the intense heat of the plasma arc 60 and its associated plasma 68 which surrounds the plasma arc 60. Molten metal particles 72 are formed on the free end 370 of the wire 310 and are atomized into fine, particles 74 by the viscous shear force established between the high velocity, ionized plasma gas 516 and the initially, stationary molten droplets. The molten particles 72 are further atomized and accelerated by the much larger mass flow of secondary gas 518 through bores 562 which converge at a location or zone 64 beyond the melting of the wire free end 370, now containing the finely atomized particles 74, which are propelled to the substrate surface 80 to form a deposit 82 on a desired substrate 84.

In the most stable condition of the apparatus 110 as shown in FIG. **6*c* but also including some components which are not pictured in FIG. 6*c*, wire 310 will be melted and particles 70 will be formed and immediately carried and accelerated by vector forces 66 in the same direction as the ionized plasma gas 516; a uniform dispersion 70 of fine particles 74, without aberrant globules 72, will be obtained. The vector forces 66 are the axial force components of the plasma arc energy and the high level converging secondary gas 518 streams. However, under some conditions, instabilities occur where particles from the melted wire free end 370 are not uniformly melted as the cathode subassembly 210 is rotated around the rotational centerline 206 of the wire 310** whereby some part of the wire free end 370 is accelerated away from the free end 370 in larger droplets 72 which are not atomized into fine particles 74. These large particles or droplets 72 are propelled as large agglomerate masses toward the substrate 84 and are included into the coating (i.e. deposit 82) as it is being formed, resulting in coating of poor quality.

As indicated earlier, high velocity secondary gas 518 is released from equi-angularly spaced bores 562 to project a curtain of gas 510 streams about the plasma arc 60. The supply 524 of secondary gas 518, such as air, is introduced into the chamber 550 under high flow, with a pressure of about 20-120 psi. The chamber 550 (i.e. gas manifold 550) acts as a plenum to distribute the secondary gas 518 to the series of equi-angularly spaced bores 562 which direct the secondary gas 518 as a concentric converging stream which assists the atomization and acceleration of the particles 70. Each bore 562 has an internal diameter of about 0.040-0.090 inches and projects a high velocity air flow at a flow rate of about 10-60 scfm from the total of all of the bores 562 combined. The plurality of bores 562, typically ten in number, are located concentrically around the constricting orifice 224, and are radially and substantially equally spaced apart. To avoid excessive cooling of the plasma arc 60, these streams are radially located so as not to impinge directly on the wire free end 370. The bores 562 are spaced angularly apart so that the wire free end 370 is centered midway between two adjacent bores 562, when viewed along the axial centerline 204 of the constricting orifice 224. Thus, as shown in FIG. 6*c*, bores 562 will not appear because the section plane is through the wire 310. FIG. 6*b* shows the bores 562 only for illustration purposes and it should be understood they are shown out of position (typically 18 degrees for a plasma nozzle 222 with 10 radial bores 562) and are not in the section plane for this view. The converging angle of the gas 510 streams is typically about 30 degrees relative to the axial centerline 204 of the constricting orifice 224, permitting the gas 510 streams to engage the particles 70 downstream of the wire-plasma intersection zone 64.

VII. Glossary/Index

Table 1 below is comprised of a chart that cross-references element numbers, element names, and element definitions/descriptions.

-continued

| Element Number | Element Name | Element Definition/Descriptions |
|---|---|---|
| 50 | Prior Art Apparatus | A prior art PTWA (plasma transferred wire arc) thermal spraying apparatus. |
| 60 | Plasma Arc | An arc forming between a cathode 212 and a free end 370 of a wire 310. The arc is comprised of a jet of very hot plasma produced from electric current 490 traveling through ionized plasma gas 516 in the space between the cathode 212 and the wire 310. |
| 61 | Gap | The space between the cathode 212 and the free end 370 of the wire. |
| 62 | Plasma Plume | The area surrounding a plasma arc 60 where non-atomized particles 72 are atomized. |
| 64 | Zone | An area or location beyond the melting of the free end 370 of the wire 310. The zone 64 can also be referred to as a wire-plasma intersection zone. |
| 66 | Vector Forces | Forces pushing particles 70 in the same direction of the ionized plasma gas 516. |
| 68 | Associated Plasma | Plasma that surrounds the plasma plume 62. |
| 70 | Particles or Particle Stream | The system 100 atomizes the particles 70 in the wire 310 and sprays them towards a surface 80. The particles 70 projected towards the surface 80 are originally solid, in the form of the wire 310. A free end 370 of the wire 310 is melted into non-atomized particles 72 and then atomized into atomized particles 74 which are then sprayed on the desired surface 80. The purpose of the system 100 is to generate a particle stream 70 of atomized particles 74. Realistically, some quantity of non-atomized particles 72 will be included in the particle stream 70. The further from optimal the operation of the system 100 becomes, the greater the ratio of non-atomized particles 72 to atomized particles 74. |
| 71 | Spit | A more extreme example of non-atomized particles 72 in the particle stream 70 that is visible to the human eye. The existence of spit 71 in the particle stream 70 means that operation of the system 100 is likely not satisfactory. |
| 72 | Non-Atomized Particles | Particles 70 from the wire that have been melted or partially melted, but not fully atomized. In the theoretically optimal and aspirational operation of the system 100, the particle stream 70 is comprised entirely of atomized particles 74. Realistically however, there will also be non-atomized particles 72 in the particle stream 70. As the operation of the system 100 falls further away from optimal, the non-atomized particles 72 can be in the form of spit 71. Non-atomized particles 72 can also often be referred to as molten metal particles since at the applicable temperature, the metal material from the wire 310 will be in a molten or at least substantially molten form. |
| 74 | Atomized Particles | Particles 70 from the wire that are in a sufficiently fine form as to be suitable for spraying on the surface 80 of the substrate 84. |
| 80 | Surface | The exterior face or boundary of the substrate 84 which is being sprayed with particles 70 from the system 100. |
| 82 | Deposit | In a properly functioning system 100, the deposit 82 is the buildup of atomized particles 74 sprayed onto the surface 80 by the system 100 or apparatus 110. Realistically, the deposit 82 is likely to include some quantity of non-atomized particles 72. A deposit 82 of spit 71 is typically unacceptable. |
| 84 | Substrate | The material being sprayed on by the system 100 or apparatus 110. The deposit 82 is formed from spraying the particles 70 onto the surface 80 of the substrate 84. |
| 100 | Plasma Arc Thermal Spray System | A PTWA (plasma transferred wire arc) system for projecting (i.e. spraying) atomized particles 74 onto a surface 80 of a substrate 84 that utilizes one or more sensors 610 to monitor the operations of the system 100, e.g. the "system" 100. The system 100 can be implemented in a wide variety of embodiments, including a variety of different apparatuses 110 and methods 900. |

-continued

| Element Number | Element Name | Element Definition/Descriptions |
|---|---|---|
| 110 | Plasma Arc Thermal Spray Apparatus | A plasma arc thermal spray system 100 in the form of an at least substantially integrated apparatus 110. |
| 200 | Torch Assembly | An aggregate configuration of subassemblies, components, and parts that provide for the creation and sustaining of a plasma arc 60 from the cathode 212 to a free end 370 of a wire 310. The inputs for the torch assembly 200 are electricity 490 from a power delivery assembly 400, a wire 310 from a wire delivery assembly 300, and a gas 510 from a gas delivery assembly 500. |
| 202 | Torch Body | The torch assembly 200 enclosed in an exterior surface. |
| 204 | Axial Centerline | A central axis of the constricting orifice 224. |
| 206 | Rotational Centerline | A central axis around which the cathode 212 revolves around in an orbit 280 that is typically at least substantially circular in shape. In some embodiments, the rotational centerline 206 is the position of the wire 310. In other embodiments, there is an offset between the position of the wire 310 and the rotational centerline 206 (see U.S. Pat. No. 8,581,138). |
| 210 | Cathode Subassembly | An aggregate configuration of components and parts that support the functionality of the cathode 212 within the torch assembly 200. |
| 212 | Cathode | A negatively charged electrode used to form the plasma arc 60. |
| 214 | Cathode Holder | A structure that secures the position of the cathode 212 relative to the other components of the torch assembly 200 and the various inputs delivered to the torch assembly 200. |
| 216 | Gas Port | An opening in the cathode holder 214 or torch body 202 through which gas 510 exits. The gas port 216 allows for the delivery of gas 510 to the cathode 212. Gas 510 travelling to the cathode 212 through the gas port 216 is an important input for the creation of the plasma arc 60. |
| 220 | Nozzle | A projecting spout through which something flows in an outward direction. |
| 222 | Anode Nozzle or Plasma Nozzle | A nozzle 220 through which plasma gas 512 exits. |
| 224 | Constricting Orifice | An opening or passageway that narrows as the plasma gas 512 travels through it. |
| 280 | Orbit | A pathway around a rotational centerline 206 that is typically at least substantially circular in shape. Much of the literature on prior art PTWA 50 describes this movement as a rotation around the rotational centerline 206 by the cathode 212. |
| 300 | Wire Delivery Assembly | An aggregate configuration of components that provide for the movement of the wire 310 towards the position where a free end 370 of the wire 310 is positioned for the plasma arc 60. The wire delivery assembly 300 can also be referred to as a wire assembly 300. |
| 310 | Wire | A metallic material in the shape of a slender, string-like piece or filament. The wire 310 is comprised of the matter from which the atomized particles 74 are derived and directed to the surface 80 of the substrate 84. |

-continued

| Element Number | Element Name | Element Definition/Descriptions |
|---|---|---|
| 320 | Feedstock | A portion of the wire 310 that is the opposite end to the free end 370. Feedstock 320 can also be referred to as the wire base or wire supply. Feedstock 320 is the portion of the wire 310 that is not yet within the rollers 340, the contact tip 422, or the guide tip 330. The feedstock 320 is where the supply of wire 310 is positioned and stored until the speed-controlled motor 350 moves the particular portion of the wire 310. |
| 330 | Guide Tip | A hollow structure through which the wire 310 moves. The guide tip 350 is often the final structure that helps position the wire 310 and more specifically the free end 370 of the wire 310 at the desired position for the creation and sustaining of a plasma arc 60. |
| 332 | Guide Tip Block | This structure provides support for the guide tip 330. It is typically contained within an insulating object 430. |
| 340 | Rollers | Rotating structures that are at least substantially cylindrically shaped. Rollers 340 are powered by the speed-controlled motor 350. Rollers 340 move the wire 310 towards the guide tip 330. |
| 350 | Speed-Controlled Motor | An engine that moves a free end 370 of the wire 310 (with the rest of the wire 310 following) through the wire delivery assembly 300 to the desired position for the plasma arc 60. The speed-controlled motor 350 moves the wire 310 by powering the rollers 340. |
| 352 | Wire Speed | The velocity at which the wire 370 moves towards the gap 61. Wire speed 352 is controlled primarily by the motor 350. |
| 370 | Free End | An end portion of the wire 310 that is melted and atomized within a proper plasma arc 60. The free end 370 of the wire 310 is opposite to the feedstock 320 end. The free end 370 of the wire 310 includes an end tip 371 as well as the portions/lengths of the wire prior to the end tip 371. The free end 370 of the wire 310 is from the end tip 371 to portions of the wire 310 that have just passed through the guide tip 330. |
| 371 | End Tip | The portion of the free end 370 that is the precise end position. |
| 400 | Power Delivery Assembly | An aggregate configuration of subassemblies, components, and parts that collectively provide the electricity 490 used to sustain the plasma arc 60. In most embodiments of the system 100, the power delivery assembly 400 provides for supplying electricity 490 in the form of direct current (DC) electricity 490. The power delivery assembly 400 can also be referred to as a power assembly 400. |
| 410 | Power Supply | A device that provides the electricity 490 for forming the plasma arc 60 from the cathode 212 to the free end 370 of the wire 310. |
| 412 | DC Power Source | A power supply 410 that provides for directing electricity 490 in the form of direct current (DC) along the electrical pathway 492. |

-continued

| Element Number | Element Name | Element Definition/Descriptions |
|---|---|---|
| 420 | Lead/Contact | An electrical connection comprising a length of wire or a metal conductive pad. The power delivery assembly 400 can utilize a wide variety of different leads/contacts 420 to direct electricity 490 throughout the power delivery assembly 400. |
| 422 | Contact Tip | A lead 420 in direct physical contact with the wire 310 that provides for routing electricity 490 to the wire 310. In some embodiments, the contact tip 422 can be made up of two or more pieces such as 422A and 422B, held in spring or pressure load contact with the wire 310 by a rubber ring 432 or other similar structure. |
| 430 | Insulating Object | A structure that does not conduct electricity 490. The system 100 may use various insulating objects 430 to direct electricity 490 through the desired electrical pathway 492. |
| 432 | Rubber Ring | An insulating object 430 typically used to hold the contact tip 422 together with the wire 310 so that the portion of the wire 310 in contact with the contact tip 422 to the free end 370 becomes part of the electrical pathway 492. |
| 434 | Insulating Block | An insulating object 430 that insulates the portion of the wire 310 between the contact tip 422 and the free end 370. |
| 450 | Open Circuit | An unintentional gap in the electrical pathway 492 that can negatively impact the performance of the system 100. An open circuit 450 can also be referred to as a bad contact 450. |
| 490 | Electricity | A form of energy resulting from the existence of charged particles (such as electrons or protons), either statically as an accumulation of charge or dynamically as a current. Electricity 492 is a necessary input for creating and sustaining a plasma arc 60. |
| 492 | Circuit or Electrical Pathway | A route that the electricity 490 forming the plasma arc 60 travels from the power supply 410 to the plasma arc 60 and back again. |
| 500 | Gas Delivery Assembly | An aggregate configuration of subassemblies, components, and parts that collectively provide the gas 510 or gasses 510 used to sustain the plasma arc 60. The gas delivery assembly 500 can also be referred to as a gas assembly 500. |
| 510 | Gas | A non-solid, non-liquid and non-ionized material supplied to the torch assembly 200. |
| 512 | Plasma Gas | A gas 510 that will become ionized to create and sustain the plasma arc 60. An example of a suitable plasma gas 512 is Ar—H2 65/35. |
| 516 | Ionized Plasma Gas | Plasma gas 512 in a sufficiently heated, ionized, and in a high velocity state (often supersonic) that it is suitable for atomizing the material in the free end 370 of the wire 310. |
| 518 | Secondary Gas | A gas 510 that is not plasma gas 512. A secondary gas 518 is typically introduced into the gas manifold 550 under high flow. Secondary gas 518 is typically used to direct the atomized particles 74 of the wire 310 in the desired direction. Secondary gas 518 is used to further atomize and accelerate the particles 70. |

-continued

| Element Number | Element Name | Element Definition/Descriptions |
|---|---|---|
| 520 | Gas Source | A subassembly or component that supplies one or more gases 510 to the system 100 or apparatus 110. |
| 522 | Primary Gas Source/Plasma Gas Source | The gas source 520 for plasma gas 512. |
| 524 | Secondary Gas Source | The gas source 520 for secondary gas 518. |
| 530 | Gas Port | A passageway through which gas 510 can travel and is directed to travel from one location within the system 100 to another location. |
| 532 | Plasma Gas Port | A port 530 that provides for the delivery of plasma gas 512 to the cathode holder 214. |
| 534 | Secondary Gas Port | A port 530 that provides for the delivery of secondary gas 518 to the gas manifold 550. |
| 536 | Insulator Block Gas Port | A port 530 within the insulator block 434 that provides for a small amount of secondary gas 518 to be directed through the insulator block 424 to facilitate the removal of heat from the insulator block 434. |
| 550 | Gas Manifold | A cavity or chamber formed between the baffle plate 552 and the torch body 202. The gas manifold 550 is used in the process of directing the flow of secondary gas 518. The gas manifold 550 can also be referred to as a first manifold 550. |
| 552 | Baffle Plate | A surface that along with the torch body 202 forms the walls of the gas manifold 550. |
| 560 | Second Manifold | A cavity or chamber that secondary gas 518 is directed to after the initial gas manifold 550. Secondary gas 518 moves from the first manifold 550 to the second manifold 560 through bores 562 connecting the two chambers. |
| 562 | Bores | Openings such as holes that facilitate the movement of gas 510. |
| 600 | Sensor Assembly | An aggregate configuration of components that provide for capture of sensor readings 650 from a sensor 610, and the transmission of sensor readings 650 to the IT assembly 700. The system 100 can have a varying number of sensors 610 and types of sensors 610. |
| 610 | Sensor | A device that is used to capture sensor readings 650. Sensors 610 are often defined with respect to the types of sensor measurements 650 that are captured by the sensor 610. The system 100 can include a wide variety of different sensors 610, including, but not limited to, electrical sensors 611, wire sensors 620, plasma sensors 624, and virtually any other type of sensor 610 that can be used to capture measurements 650 that would be useful to the monitoring of the system 100. |
| 611 | Electrical Sensor | A sensor 610 that is used to capture measurements 650 relating to attributes of electricity 490 and electrical pathways 492. The system 100 includes at least one electrical sensor 611. An electrical sensor 611 captures an electrical measurement 652. Examples of electrical sensors 611 include voltage sensors 613, current sensors 615, and frequency sensors 617. |

-continued

| Element Number | Element Name | Element Definition/Descriptions |
|---|---|---|
| 612 | High Speed Electrical Sensor | An electrical sensor 611 that can capture an electrical measurement 652 at a high speed. The speed capability of the sensor 610 should be sufficient with respect to the rotational speed of the cathode 212 that a waveform 750 of data can be provided to the processor 710. A high speed electrical sensor 612 can capture an electrical measurement 652 about at least every 10 ms. |
| 613 | Voltage Sensor | An electrical sensor 611 that is used to capture voltage measurements 654 over time. |
| 614 | High Speed Voltage Sensor | A voltage sensor 613 that can take many voltage measurements 654 in a short period of time. In many embodiments, a high speed voltage sensor 614 can operate in a highly precise manner with about a minimum of +/− 10 mV accuracy in capturing measurements at least about every 10 ms. |
| 615 | Current Sensor | An electrical sensor 611 that is used to capture a current measurement 653. |
| 616 | High Speed Current Sensor | A high speed electrical sensor 612 that is used to a capture a current measurement 653. |
| 617 | Frequency Sensor | An electrical sensor 611 that is used to capture a frequency measurement 656. |
| 618 | High Speed Frequency Sensor | A high speed electrical sensor 612 that is used to a capture a frequency measurement 656. |
| 620 | Wire Sensor | A sensor 610 that is used to capture information about the wire delivery assembly 300, such as wire position 662 or wire speed 664. |
| 624 | Plasma Sensor | A sensor 610 that is used to capture information about the gas 510 delivered to the cathode 212, such as plasma flow rate 672 and plasma pressure 674. |
| 650 | Sensor Reading or Measurement | Information captured by a sensor 610. Measurements 650 can also be called sensor readings 650. Sensor measurements 650 are used by the system 100 to identify out of tolerance operating conditions 800. |
| 652 | Electrical Measurement | A measurement 650 relating to the flow of electricity 490 along the electrical pathway 492. Examples of electrical measurements 652 can include: current measurements 653; voltage measurements 654; frequency measurements 656; and other similar metrics known in the art. Electrical measurements 652 can be analyzed as a waveform 750 by the processor 710. By capturing electrical measurements 652 over time, the system 100 can monitor the operating status of the system 100 by monitoring electrical measurements 652 as a waveform 750. |
| 653 | Current Measurement | An electrical measurement 652 of a flow of electric charge. Current measurements 653 can be captured by current sensors 615. |
| 654 | Voltage Measurement | An electrical measurement 652 of a difference in electric potential energy between two points per unit electric charge. Voltage measurements 654 can be captured by a voltage sensor 613. By capturing voltage measurements 654 over time, the system 100 can monitor the operating status of the system 100 by monitoring voltage measurements 654 as a waveform 750. |

-continued

| Element Number | Element Name | Element Definition/Descriptions |
|---|---|---|
| 656 | Frequency Measurement | An electrical measurement 652 relating to frequency. Frequency measurements 656 can be captured by a frequency sensor 617. |
| 660 | Wire Measurement | A measurement 650 pertaining to the wire 310. Examples can include wire position 662, wire speed 664 and other measurements 650 relating to the wire 310. |
| 662 | Wire Position | A wire measurement 660 pertaining to the position of a free end 370 of the wire 310. |
| 664 | Wire Speed | A wire measurement 660 pertaining to the velocity of the wire 310. |
| 670 | Plasma Measurements | A measurement 650 that pertains to the gas 510 that is delivered to the area of the plasma arc 60. Examples of plasma measurements 670 include plasma flow rate 672 and plasma pressure 674. |
| 672 | Plasma Flow Rate | The velocity of gas 510 used to create the plasma arc 60. |
| 674 | Plasma Pressure | Force per unit area of the gas 510 used to create the plasma arc 60. |
| 700 | IT Assembly | An aggregate configuration of components that provide for the processing of data and the communication of components. The IT assembly 700 can also be referred to as a computer system 700. |
| 710 | Processor | A machine that is capable of being programmed, either through hardware or software. Processors 710 are sometimes referred to as microprocessors. Most processors 710 are silicon-based. |
| 712 | Application/ Program | Instructions that are provided to the processor 710. Such instructions can be implemented through hardware and/or software means. |
| 720 | Memory/RAM | A memory device that is accessible to the processor 710 and provides for the accessing of information in any order. |
| 730 | Storage Component | A device that can be used by the processor 710 to create, store, retrieve, update, and/or delete data. |
| 732 | Database | A collection of data stored in a storage component 730 that is easily accessible to the processor 710. Many but not all databases 732 are relational databases utilizing system query language (SQL). |
| 734 | Historical Data | A potential large library of data that can include past sensor readings 650, past operating parameter data, and past operator assessments relating to one or more systems 100 and/or apparatuses 110. |
| 740 | Threshold Value | A numerical value that can be selectively or non-selectively used by the processor 710 for the purposes of assessing sensor readings 650. Different embodiments of the system 100 as well as different operating conditions 800 can involve differing use of one or more threshold values 740. Threshold values 740 can be the sole and dispositive factor in triggering a particular response 770, a primary factor that weighs heavily in triggering a particular response 770, a relatively minor factor with little weight in triggering a response 770, or totally irrelevant to the triggering of a response 770. Threshold values 740 can be set by the operators of the system 100, or can be determined by heuristics that "factor in" the historical data 734 of the |

-continued

| Element Number | Element Name | Element Definition/Descriptions |
|---|---|---|
| | | system 100. Threshold values 740 can relate to different attributes of a waveform 750. Some threshold values 740 can be in the forms of ranges, with both maximum and minimum values. Other threshold values 740 involve only a minimum, a maximum, or some other unitary comparison metric. |
| 750 | Waveform | A collection of data points collected over time such that relationships between the data points such as patterns can be detected or analyzed. Waveforms 750 possess a wide range of attributes such as absolute amplitude, relative amplitude, maximum points, minimum points, frequency/period, etc. While a waveform 750 can be and often is illustrated in a visual manner, a waveform 750 is the underlying data that is capable of being visually represented in the shape of a wave. Thus a graph of a waveform 750 is a waveform 750, but the same underlying data without a visual representation of the data is also a waveform 750. Measurements 650, such as electrical measurements 652, can be put into the form of a waveform 750 by the sensor 610, the processor 710, or some other component of the system 100. The processor 710 can analyze all or some electrical measurements 652 in the form of a waveform 750, with attributes such as amplitude, frequency, and variations thereof. Examples of attributes associated with a waveform 750 can include, but are not limited to, a peak-to-peak 751, a peak-to-peak rate-of-change 752, a period 753, a period rate-of-change 754, a discontinuity 755 (such as a periodic discontinuity 756 or a non-periodic discontinuity 757), an average value 758 and an average value rate-of-change 759. |
| 751 | Peak-to-Peak Attribute | The magnitude of the difference between a minimum measurement 650 and a maximum measurement 650 in a waveform 750 with respect to a particular attribute, such as voltage, current, or some other type of data. A peak-to-peak attribute 751 can also be referred to as a peak-to-peak value 751 or simply a peak-to-peak 751. |
| 752 | Rate-of-Change-in-Peak-to-Peak Attribute | A time derivative (the rate of change over time) of the peak-to-peak attribute 751, such as voltage, current, or some other type of data. A rate-of-change-in-peak-to-peak attribute 752 can also be referred to as a rate-of-change-in-peak-to-peak 752 or a peak-to-peak rate-of-change 752. |
| 753 | Period | The time that it takes for a pattern within the waveform to repeat itself. The period corresponds with a single revolution of the torch cathode 212. The period 753 is inversely proportional to frequency. Waveforms 750 generated by measurements 650 of the system 100 can be impacted by the rotation of the cathode 212 around a central axis of space which is typically either the position of the wire 310 or a position that is slightly offset from the position of the wire 310. |

-continued

| Element Number | Element Name | Element Definition/Descriptions |
|---|---|---|
| 754 | Rate-of-Change-in-Period | A time derivative (the rate of change over time) of the period 753. A rate-of-change-in-period 754 can also be referred to as a period rate-of-change 754. |
| 755 | Discontinuity | A substantial change in the shape of the waveform 750. Discontinuities 755 can be periodic 756 and non-periodic 757. |
| 756 | Periodic Discontinuity | A discontinuity 755 that repeats itself with a given frequency. |
| 757 | Non-Periodic Discontinuity | A discontinuity 755 that does not appear to repeat itself with a given frequency. |
| 758 | Average Value | An average value the measurements 650 making up the waveform 750. |
| 759 | Rate-of-Change-in-Average Value | A time derivative (the rate of change over time) in the change of average value 757. A rate-of-change-in-average-value 759 can also be referred to as an average value rate-of-change 759. |
| 770 | Response | A reaction to one or more sensor readings 650 generated by the processor 710. Responses 770 can include one or more warnings 772 and one or more automatic adjustments 790. |
| 772 | Warning | A response 770 that is comprised of a communication. Warnings 772 serve to notify operators of the system 100 as well as for management. |
| 773 | Wire Warning | A warning 772 that relates to the delivery of wire 310 to the plasma arc 60. |
| 774 | Gas Warning | A warning 772 that relates to the delivery of gas 510 to the cathode 212. |
| 775 | Power Warning | A warning 772 that relates to the flow of electricity 490 through the electrical pathway 492. |
| 776 | Plasma Distortion Warning | A warning 772 that relates to the shape, location, and the consistency of the plasma plume 62. |
| 790 | Automatic Adjustment | A response 770 by the system 100 or apparatus 110 that is beyond that of communication. An automatic adjustment 790 involves a modification in the operation of the system 100 or apparatus 110. Examples of automatic adjustments 790 can include, but are not limited to, a change in feed rate 791, a modification of the wire feed process 792, and a shutdown 799. |
| 791 | Change Feed Rate | The speed/velocity of the wire 310 can be adjusted by the processor 710 by instructing the speed-controlled motor 350 to either speed up or slow down. |
| 792 | Modify Wire Feed Process | A bent wire condition 801 can be addressed by adjusting the operation of the wire delivery assembly 300 so that the wire 310 is straightened. |
| 799 | Shutdown | The system 100 or apparatus 110 can be automatically shut down to avoid waste or damage. |
| 800 | Operating Condition | An operating parameter 800 of the system 100. An operating condition 800 can be within acceptable tolerances, outside of acceptable tolerances, and/or identified as likely to move outside of acceptable tolerances. In many contexts, assessment of the particular condition 800 can involve assessing the magnitude of the condition, as well as other attributes of the condition 800. |

-continued

| Element Number | Element Name | Element Definition/Descriptions |
|---|---|---|
| 801 | Wire Curvature | An operating condition 800 that is indicative of a wire 310 being curved instead of straight. Some embodiments of the system 100 can assess the magnitude and orientation of the bend in the wire 310. |
| 802 | Wire Curvature Rate of Change | The time derivative (rate of change over time) of the wire curvature 801. |
| 803 | Torch RPM | The speed at which the torch assembly 200 revolves around a central point. RPM stands for rotations per minute. |
| 804 | Torch RPM Rate of Change | The time derivative (rate of change over time) of the torch RPM 803. |
| 805 | Wire Feed Motion | The motion of the wire 310 towards the gap 61. Wire Feed Motion 805 can encompass both velocity and acceleration. |
| 806 | Poor Electrical Contact | A point in the electrical pathway 492 where electricity 490 does not readily flow. |
| 807 | Rotationally-Dependent Poor Electrical Contact | A poor electrical contact 806 problem that is periodic with the revolution of the torch assembly 200 around a center point. |
| 808 | Plasma Distortion | When the plasma gas 512 exits the plasma nozzle 222 in a manner that is not intended. |
| 809 | Plasma Distortion Rate of Change | A time derivative (rate of change over time) of the plasma distortion 808. |
| 900 | Method | A process of steps for detecting out of tolerance operating conditions 800 in the thermal spray process and selectively generating a response 770. |
| 1010 | Operations Subsystem | A collection of assemblies, structures, activities, and information that relate to the creation of a plasma arc 60 across a gap 61. |
| 1020 | Data Capture Subsystem | A collection of assemblies, structures, activities, and information that relate to the capture of measurements 650 from the operations subsystem 1010. |
| 1030 | Data Analysis Subsystem | A collection of assemblies, structures, activities, and information that relate to the analyzing of a waveform 750 resulting from the measurements 650. |

The invention claimed is:

1. A plasma spray apparatus (110) capable of using a electricity (490) from a pathway (492) that includes a cathode (212) and a free end (370) of a wire (310) to create a plasma arc (60) between the cathode (212) and the free end (370) of a wire (310), said plasma spray apparatus (110) comprising:

a sensor (610) for capturing a plurality of measurements (650) over time from the pathway (492), said plurality of measurements (650) including a plurality of electrical measurements (652), wherein said sensor (610) is adapted to transmit said measurements (650) to a processor (710); and said processor (710) that over time receives said measurements (650) from said sensor (610), wherein said processor (710) creates a waveform (750) from said measurements (650), wherein said waveform (750) includes at least a subset of said plurality of electrical measurements (652)

wherein said processor (710) uses said waveform (750) to selectively identify a curved wire condition (801) in the wire (310); and wherein said processor (710) automatically triggers a response (770) to said curved wire condition (801).

2. The plasma spray apparatus (110) of claim 1, said plasma spray apparatus (110) further comprising a wire delivery assembly (300) that provides for the movement of the wire (310) towards the plasma arc (60), wherein said cathode (212) rotates around said free end (370) of said wire (310), and wherein said response (770) relates to the operation of the wire delivery assembly (300).

3. The plasma spray apparatus (110) of claim 1, wherein said response (770) includes an automatic shutdown (799) of said plasma spray apparatus (110) triggered by said curved wire condition (801).

4. The plasma spray apparatus (110) of claim 1, wherein said waveform (650) includes a period (753), and wherein said period (753) of said waveform (650) influences the selective identification of said curved wire condition (801) in the wire (310) by said processor (710).

5. The plasma spray apparatus (110) of claim 1, said plurality of measurements (650) further including a plurality of wire measurements (660), wherein said processor (710) selectively generates a second response (770) that is triggered at least in part by at least a subset of said wire measurements (660).

6. The plasma spray apparatus (110) of claim 1, wherein said response (770) is a warning (772) pertaining to an operating condition (800) of said plasma spray apparatus (110).

7. The plasma spray apparatus (110) of claim 1, wherein said response (770) is an automatic adjustment (790) pertaining to said curved wire condition (801) in said wire (310).

8. The plasma spray apparatus (110) of claim 1, said plasma spray apparatus (110) further comprising a plurality of sensors (610) adapted to capture a plurality of measurements (650), said plurality of sensors (610) including an electrical sensor (611) to capture said electrical measurements (652) and a wire sensor (620) to capture a plurality of wire measurements (660), wherein the identifying of said curved wire condition (801) in the wire (310) is influenced by at least one said wire measurement (660).

9. The plasma spray apparatus (110) of claim 1, said plasma spray apparatus (110) further comprising a plurality of sensors (610) adapted to capture a plurality of measurements (650);

said plurality of sensors (610) including an electrical sensor (611), a wire sensor (620), and a plasma sensor (624);

said plurality of measurements (650) further including a plurality of wire measurements (660) captured by said wire sensor (620) and a plurality of plasma measurements (670) captured by said plasma sensor (624); and wherein said processor (710) is adapted identify a plurality of different operating conditions (800), wherein the identification of at least said one said operating condition (800) by said processor (710) is selectively influenced by said wire measurements (660), and wherein the identification of at least one said operation condition (800) by said processor (710) is selectively influenced by said plasma measurements (670).

10. The plasma spray apparatus (110) of claim 1, wherein said processor (710) provides for selectively generating a plurality of responses (770) to a plurality of operating conditions (800) pertaining to said plasma spray apparatus (110), said plurality of responses (770) including a plurality of warnings (772) and a plurality of automatic adjustments (790), said plurality of responses (770) including a wire warning (773), a gas warning (774), a power warning (775) and a plasma distortion warning (776).

11. The plasma spray apparatus (110) of claim 1, wherein the identification of said operating conditions (800) in said plasma spray apparatus (100) is influenced by at least one of a plurality of attributes of said waveform (750); (a) a peak-to-peak attribute (751); (b) a ΔPeak-to-Peak attribute/Δt (752); (c) a period (753); (d) a ΔPeriod/Δt (754); and (e) a discontinuity (755).

12. The plasma spray apparatus (110) of claim 1, wherein said processor (710) provides for storing said plurality of measurements (650) on a database (732) as historical data (734), wherein said processor (710) provides for comparing said measurements (650) to a threshold value (740) to selectively generate said response (770), and wherein said threshold value (740) is selectively influenced by said historical data (734) originating from outside said plasma spray apparatus (110).

13. A plasma spray system (100) that includes a pathway (492) of electricity (490) used to create a plasma arc (60) between a cathode (212) and a free end (370) of a wire (310), wherein said cathode (212) rotates around the free end (370) of the wire (310), said system (100) comprising:

a sensor assembly (600) that includes at least one electrical sensor (611) for capturing a plurality of electrical measurements (652) over time from the pathway (492) used to create the plasma arc (60), wherein said electrical sensor (611) is adapted to transmit said electrical measurements (652) to a processor (710); and a computer system (700), said computer system (700) including said processor (710) that provides for receiving said plurality of electrical measurements (652) from said electrical sensor (611), wherein said processor (710) is adapted to create a waveform (750) from at least a subset of said electrical measurements (652);

wherein said processor (710) uses said waveform (750) to selectively identify a curved wire condition (801) in the wire (310); and wherein said processor (710) automatically triggers a response (770) to said curved wire condition (801).

14. The plasma spray system (100) of claim 13, wherein said waveform (750) includes a period (753), and wherein said period (753) of said waveform (750) selectively influences the identification of said curved wire condition (801) in the wire (310).

15. The plasma spray system (100) of claim 13, wherein said processor (710) of plasma spray system (100) is adapted to automatically trigger a plurality of responses (770) when said curved wire condition (801) is identified by said processor (710).

16. The plasma spray system (100) of claim 13, wherein said processor (710) is adapted to automatically trigger a plurality of responses (770), said plurality of responses (770) include a wire warning (773), a modify wire feed process (792), and a shutdown (799).

17. The plasma spray system (100) of claim 13, wherein said waveform (650) includes a rate-of-change-in-period attribute (754) that selectively influences the identification of said curved wire condition (801).

18. A method of performing plasma spraying (900), comprising:

creating (940) a plasma arc (60) between a cathode (212) and a free end (370) of a wire (310), wherein said cathode (212) rotates around said free end (370) of said wire (310);

capturing (950) a plurality of electrical measurements (652) from an electrical sensor (611), wherein said plurality of electrical measurements (652) are captured by said electrical sensor (611) from a pathway (492) providing electricity (490) to said cathode (212) and said free end (370) of said wire (310);

transmitting (960) said electrical measurements (652) to a processor (710);

analyzing (962) at least a subset of said electrical measurements (652) as a waveform (750) by said processor (710); and generating (970) a response (770), wherein said response (770) pertaining to the wire (310) is automatically triggered by said processor (710).

19. The method (900) of claim 18, wherein the generating (970) of said response (770) is also influenced by a threshold value (740) that is derived from a database (732) of historical data (734).

20. The method (900) of claim 18, wherein said processor (710) provides for generated a plurality or responses (770) to a plurality of operating conditions (800), said plurality of responses (770) including a plurality of warnings (772) pertaining to at least a subset of said operating conditions (800) and a plurality of automatic adjustments (790) pertaining to a plurality of operating conditions (800).

* * * * *